United States Patent
Zhai et al.

(10) Patent No.: US 8,667,414 B2
(45) Date of Patent: Mar. 4, 2014

(54) GESTURAL INPUT AT A VIRTUAL KEYBOARD

(75) Inventors: Shumin Zhai, Los Altos, CA (US); Kun Li, Boulder, CO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/592,131

(22) Filed: Aug. 22, 2012

(65) Prior Publication Data

US 2013/0249818 A1     Sep. 26, 2013

Related U.S. Application Data

(60) Provisional application No. 61/614,976, filed on Mar. 23, 2012.

(51) Int. Cl.
| | |
|---|---|
| *G06F 3/048* | (2013.01) |
| *G06F 3/033* | (2013.01) |
| *G06F 3/02* | (2006.01) |
| *G06F 3/041* | (2006.01) |

(52) U.S. Cl.
USPC ............ 715/773; 715/863; 345/168; 345/173

(58) Field of Classification Search
USPC ................... 715/773, 863; 345/156, 168, 173
See application file for complete search history.

(56) References Cited

U.S. PATENT DOCUMENTS

| | | | |
|---|---|---|---|
| 6,286,064 B1 | 9/2001 | King et al. | |
| 6,292,179 B1 | 9/2001 | Lee | |
| 6,801,190 B1 | 10/2004 | Robinson et al. | |
| 7,028,259 B1 | 4/2006 | Jacobson | |
| 7,030,863 B2 | 4/2006 | Longe et al. | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 | 8/2006 | Kushler et al. | |
| 7,145,554 B2 | 12/2006 | Bachmann | |
| 7,151,530 B2 | 12/2006 | Roeber et al. | |
| 7,199,786 B2 | 4/2007 | Suraqui | |
| 7,250,938 B2 | 7/2007 | Kirkland et al. | |
| 7,251,367 B2 | 7/2007 | Zhai | |

(Continued)

FOREIGN PATENT DOCUMENTS

| | | |
|---|---|---|
| WO | 2004/066075 A2 | 8/2004 |
| WO | 2008/013658 A2 | 1/2008 |

OTHER PUBLICATIONS

Tappert et al., The State of the Art in On-Line Handwriting Recognition, Aug. 1990, 787-808.*

(Continued)

*Primary Examiner* — Nicholas Ulrich
(74) *Attorney, Agent, or Firm* — Shumaker & Sieffert, P.A.

(57) ABSTRACT

A computing device is operatively coupled to a presence-sensitive surface associated with a virtual keyboard. The computing device receives an indication of a gesture input on a portion of the presence-sensitive surface associated with the virtual keyboard. In response, the computing device defines a series of input points that represent a path of the gesture input across the virtual keyboard. In addition, the computing device defines anchor points for virtual keys of the virtual keyboard. The computing device then determines distance scores for the anchor points words based on distances on the presence-sensitive surface between the input points and the anchor points. The computing device identifies a word that corresponds to the gesture input based on the distance scores for the anchor points.

19 Claims, 13 Drawing Sheets

(56) References Cited

U.S. PATENT DOCUMENTS

| | | | |
|---|---|---|---|
| 7,277,088 B2 | 10/2007 | Robinson et al. | |
| 7,336,827 B2* | 2/2008 | Geiger et al. | 382/186 |
| 7,382,358 B2 | 6/2008 | Kushler et al. | |
| 7,453,439 B1 | 11/2008 | Kushler et al. | |
| 7,487,461 B2 | 2/2009 | Zhai et al. | |
| 7,508,324 B2 | 3/2009 | Suraqui | |
| 7,542,029 B2 | 6/2009 | Kushler | |
| 7,706,616 B2 | 4/2010 | Kristensson et al. | |
| 7,716,579 B2 | 5/2010 | Gunn et al. | |
| 7,730,402 B2 | 6/2010 | Song | |
| 7,750,891 B2 | 7/2010 | Stephanick et al. | |
| 7,895,518 B2* | 2/2011 | Kristensson | 715/263 |
| 7,920,132 B2 | 4/2011 | Longe et al. | |
| 7,921,361 B2 | 4/2011 | Gunn et al. | |
| 8,036,878 B2 | 10/2011 | Assadollahi | |
| 8,135,582 B2 | 3/2012 | Suraqui | |
| 8,232,973 B2 | 7/2012 | Kocienda et al. | |
| 8,266,528 B1 | 9/2012 | Hayes | |
| 2002/0013794 A1 | 1/2002 | Carro et al. | |
| 2002/0143543 A1 | 10/2002 | Sirivara | |
| 2002/0194223 A1 | 12/2002 | Meyers et al. | |
| 2003/0095053 A1 | 5/2003 | Kandogan et al. | |
| 2003/0095104 A1 | 5/2003 | Kandogan et al. | |
| 2003/0165801 A1* | 9/2003 | Levy | 434/227 |
| 2004/0120583 A1 | 6/2004 | Zhai | |
| 2004/0140956 A1* | 7/2004 | Kushler et al. | 345/168 |
| 2005/0052406 A1* | 3/2005 | Stephanick et al. | 345/156 |
| 2005/0114115 A1 | 5/2005 | Karidis et al. | |
| 2005/0190973 A1 | 9/2005 | Kristensson et al. | |
| 2006/0004638 A1 | 1/2006 | Royal et al. | |
| 2006/0026536 A1 | 2/2006 | Hotelling et al. | |
| 2006/0028450 A1 | 2/2006 | Suraqui | |
| 2006/0055669 A1* | 3/2006 | Das | 345/156 |
| 2006/0119582 A1 | 6/2006 | Ng et al. | |
| 2006/0176283 A1 | 8/2006 | Suraqui | |
| 2006/0253793 A1 | 11/2006 | Zhai et al. | |
| 2006/0265648 A1 | 11/2006 | Rainisto et al. | |
| 2007/0016862 A1 | 1/2007 | Kuzmin | |
| 2007/0040813 A1* | 2/2007 | Kushler et al. | 345/173 |
| 2007/0083276 A1 | 4/2007 | Song | |
| 2007/0094024 A1 | 4/2007 | Kristensson et al. | |
| 2007/0213983 A1 | 9/2007 | Ramsey | |
| 2008/0017722 A1 | 1/2008 | Snyder et al. | |
| 2008/0122796 A1 | 5/2008 | Jobs et al. | |
| 2008/0172293 A1 | 7/2008 | Raskin et al. | |
| 2008/0232885 A1 | 9/2008 | Mock et al. | |
| 2008/0270896 A1 | 10/2008 | Kristensson | |
| 2008/0316183 A1 | 12/2008 | Westerman et al. | |
| 2009/0058823 A1 | 3/2009 | Kocienda | |
| 2009/0119376 A1 | 5/2009 | Bomma | |
| 2009/0189864 A1 | 7/2009 | Walker et al. | |
| 2010/0021871 A1 | 1/2010 | Layng et al. | |
| 2010/0070908 A1 | 3/2010 | Mori et al. | |
| 2010/0125594 A1 | 5/2010 | Li et al. | |
| 2010/0141484 A1 | 6/2010 | Griffin et al. | |
| 2010/0199226 A1 | 8/2010 | Nurmi | |
| 2010/0235780 A1 | 9/2010 | Westerman et al. | |
| 2010/0271299 A1 | 10/2010 | Stephanick et al. | |
| 2011/0061017 A1 | 3/2011 | Ullrich et al. | |
| 2011/0063231 A1 | 3/2011 | Jakobs et al. | |
| 2011/0066984 A1* | 3/2011 | Li | 715/863 |
| 2011/0071834 A1 | 3/2011 | Kristensson et al. | |
| 2011/0107206 A1 | 5/2011 | Walsh et al. | |
| 2011/0119617 A1 | 5/2011 | Kristensson | |
| 2011/0122081 A1 | 5/2011 | Kushler | |
| 2011/0202836 A1 | 8/2011 | Badger et al. | |
| 2011/0208511 A1 | 8/2011 | Sikstrom et al. | |
| 2011/0208513 A1 | 8/2011 | Nicks et al. | |
| 2011/0210850 A1 | 9/2011 | Tran | |
| 2011/0242000 A1 | 10/2011 | Bi et al. | |
| 2011/0254798 A1* | 10/2011 | Adamson et al. | 345/173 |
| 2012/0011462 A1 | 1/2012 | Westerman et al. | |
| 2012/0029910 A1 | 2/2012 | Medlock et al. | |
| 2012/0036469 A1 | 2/2012 | Suraqui | |
| 2012/0079412 A1 | 3/2012 | Kocienda et al. | |
| 2012/0098846 A1 | 4/2012 | Wun et al. | |
| 2012/0113008 A1* | 5/2012 | Makinen et al. | 345/168 |
| 2012/0127080 A1* | 5/2012 | Kushler et al. | 345/168 |
| 2012/0127082 A1* | 5/2012 | Kushler et al. | 345/169 |
| 2012/0131035 A1 | 5/2012 | Yang et al. | |
| 2012/0223889 A1 | 9/2012 | Medlock et al. | |
| 2012/0242579 A1 | 9/2012 | Chua | |
| 2013/0046544 A1 | 2/2013 | Kay et al. | |
| 2013/0082824 A1 | 4/2013 | Colley | |
| 2013/0120266 A1 | 5/2013 | Griffin et al. | |

OTHER PUBLICATIONS

Li, Protractor: A Fast and Accurate Gesture Recognizer, Apr. 2010, 2169-2172.*

Wobbrock et al., "$1 Unistroke Recognizer in JavaScript", [online]. First accessed on Jan. 24, 2012. Retrieved from the Internet: <http://depts.washington.edu/aimgroup/proj/dollar/> 2 pgs.

Kristensson et al., "SHARK2: A Large Vocabulary Shorthand Writing System for Pen-based Computers", UIST 2004, Proceedings of the 17th Annual ACM Symposium on User Interface Software and Technology, pp. 43-52.

"SlideIT Soft Keyboard", SlideIT [online]. First accessed on Jan. 31, 2012. Retrieved from the Internet: <https://play.google.com/store/apps/details?id=com.dasur.slideit.vt.lite&hl=en> 4 pgs.

Wobbrock et al., "Gestures without Libraries, Toolkits or Training: A $1 Recognizer for User Interface Prototypes", UIST 2007, Proceedings of the 20th Annual ACM Symposium on User Interface Software and Technology, pp. 159-168.

Suraqui, U.S. Appl. No. 60/505,724, filed Sep. 22, 2003, 47 pgs.

Suraqui, U.S. Appl. No. 60/430,338, filed Nov. 29, 2002, 31 pgs.

Split Keyboard for iPad [Concept], by Skipper Eye, Apr. 23, 2010, found at http://www.redmondpie.corn/split-keyboard-for-ipad-9140675/, 6 pp.

Split Keyboard for Thumb Typing Coming to iPad with iOS 5, by Kevin Purcell, Jun. 6, 2011, found at http://www.gottabemobile.com/2011/06/06/split-keyboard-for-thumb-typing-corning-to-ipad-with-ios-5/, 8 pp.

7 Swype keyboard tips for better Swyping, by Ed Rhee, found at http://howto.cnet.com/8301-11310_39-20070627-285/7-swype-keyboard-tips-for-better-swyping/, posted Jun. 14, 2011, 5 pp.

Keymonk—The Future of Smartphone Keyboards, found at www.keymonk.com, downloaded Sep. 5, 2012, 2 pp.

Keymonk Keyboard Free—Android Apps on Google Play, Description, found at https://play.google.com/store/apps/details?id=com.keymonk.latin&hl=en, downloaded Oct. 3, 2012, 2 pp.

Keymonk Keyboard Free—Android Apps on Google Play, User Reviews, found at https://play.google.com/store/apps/details?id=com.keymonk.latin&hl=en, downloaded Oct. 3, 2012, 2 pp.

Keymonk Keyboard Free—Android Apps on Google Play, What's New, found at https://play.google.com/store/apps/details?id=com.keymonk.latin&hl=en, downloaded Oct. 3, 2012, 2 pp.

Keymonk Keyboard Free—Android Apps on Google Play, Permissions, found at https://play.google.com/store/apps/details?id=com.keymonk.latin&hl=en, downloaded Oct. 3, 2012, 2 pp.

ShapeWriter Keyboard allows you to input on Android the same experience with on PC, Android forums, found at talkandroid.com/.../2767-shapewriter-keyboard-allows-you-input-android-same-experience-pc.html, last updated Oct. 25, 2009, 3 pp.

ShapeWriter vs Swype Keyboard, DroidForums.net, found at www.droidforums.net/forum/droid-applications/48707-shapewriter-vs-swype-keyboard.html, last updated Jun. 1, 2010, 5 pp.

Advanced tips for Swype, found at www.swype.com/tips/advanced-tips/, downloaded Aug. 20, 2012, 3 pp.

Welcome to CooTek—TouchPal, an innovative soft keyboard, TouchPal v1.0 for Android will Release Soon!, found at www.cootek.com/intro-android.aspx, downloaded Aug. 20, 2012, 2 pp.

Dasur Pattern Recognition Ltd. SlideIT Keyboard—User Guide, Jul. 2011, found at http://www.mobiletextinput.com/App_Open/Manual/SlideIT_UserGuide%5%BEnglish%5Dv4.0.pdf, 21 pp.

Why your typing sucks on Android, and how to fix it, by Martin Bryant, Mar. 3, 2010, found at thenextweb.com/mobile/2010/03/03/typing-sucks-android-fix/, 3 pp.

(56) References Cited

OTHER PUBLICATIONS

Avoid iPhone navigation and typing hassles, by Ted Landau, Dec. 28, 2007, found at www.macworld.com/article/1131264/tco_iphone.html, 9 pp.

Kristensson et al., "Command Strokes with and without Preview: Using Pen Gestures on Keyboard for Command Selection," CHI Proceedings, San Jose, CA, USA, Apr. 28-May 3, 2007, 10 pp.

How to Type Faster with the Swype Keyboard for Android—How-To Geek, found at www.howtogeek.com/106643/how-to-type-faster-with-the-swype-keyboard-for-android/, downloaded Jun. 4, 2012, 13 pp.

Android OS—Language & keyboard settings, found at support.google.com/ics/nexus/bin/answer.py?hl=en&answer=168584, downloaded Jun. 4, 2012, 3 pp.

Nuance Supercharges Swype, Adds New Keyboard Options, XT9 Predictive Text, and Dragon-Powered Voice Input, found at http://techcrunch.com/2012/06/20/nuance-supercharges-swype-adds-new-keyboard-options-xt9-predictive-text-and-dragon-powered-voice-input/, downloaded Jun. 4, 2012, 2 pp.

Sensory Software—Text Chat, found at www.sensorysoftware.com/textchat.html, downloaded Jun. 4, 2012, 3 pp.

Swype—Swype Basics, found at www.swype.com/tips/swype-basics/, downloaded Jun. 8, 2012, 2 pp.

Williamson et al., "Hex: Dynamics and Probabilistic Text Entry," Switching and Learning LNCS 3355, pp. 333-342, 2005.

Young et al., "Token Passing: a Simple Conceptual Model for Connected Speech Recognition Systems," Cambridge University Engineering Department, Jul. 31, 1989, 23 pp.

ShapeWriter Research Project home page, accessed May 25, 2012, found at http://www.almaden.ibm.com/u/zhai/shapewriter_research.htm, 12 pp.

"Hey Apple, What the Next iPhone Really, Really Needs Is a Much Better Keyboard," by Natasha Lomas, downloaded Apr. 22, 2013, from techcrunch.com/2013/04121/the-iphone-keyboard-stinks/?, 6 pp.

CiteSeer, "Token Passing: a Simple Conceptual Model for Connected Speech Recognition Systems" (1989), by S.J. Young et al., found at (http://citeseerx.ist.psu.edu/viewdoc/summary?doi=10.1.1.17.7829), accessed on Apr. 30, 2012, 2 pp.

Swiftkey 3 Keyboard—Android Apps on Google Play, found at https://play.google.com/store/apps/details?id=com.touchtype.swiftkey&hl=en, accessed on Jun. 8, 2012, 3 pp.

SwiftKey Counters Swipe with a Smart Version, Makes an In-Road Into Healthcare Market by Mike Butcher, found at http://techcrunch.com/2012/06/21/swiftkey-counters-swype-with-a-smarter-version-makes-an-in-road-into-healthcare-market/, Jun. 21, 2012, 1 p.

"SwiftKey 3 Keyboard—Android Apps on Google Play," found at web.archive.org/web/20121020153209/https://play.google.com/store/apps/details?id=com.touchtype.swiftkey&hl=en, accessed on Oct. 20, 2012, 4 pp.

SwiftKey 3 Keyboard—Android Apps on Google Play, found at web.archive.org/web/20121127141326 1https://play.google.com/store/apps/details?id=com.touchtype.swiftkey&hl=en, accessed on Nov. 27, 2012, 4 pp.

Swiftkey, "Swiftkey 3 Keyboard" retrieved from https://play.google.com/store/apps/detais, accessed on Jul. 17, 212, 3 pp.

"Swipe Nuance Home, Type Fast, Swipe Faster," found at http://www.swipe.com/, accessed on May 25, 2012, 1 p.

U.S. Appl. No. 13/793,825, by Xiaojun Bi, filed Mar. 11, 2013.
U.S. Appl. No. 13/657,574, by Yu Ouyang, filed Oct. 22, 2012.
U.S. Appl. No. 13/858,684, by Yu Ouyang, filed Apr. 8, 2013.
U.S. Appl. No. 13/787,513, by Shuman Zhai, filed Mar. 6, 2013.
U.S. Appl. No. 13/646,521, by Shumin Zhai, filed Oct. 5, 2012.
U.S. Appl. No. 13/734,810, by Yu Ouyang, filed Jan. 24, 2013.
International Search Report and Written Opinion of international application No. PCT/US2013/033166, dated Jun. 4, 2013, 9 pp.

* cited by examiner

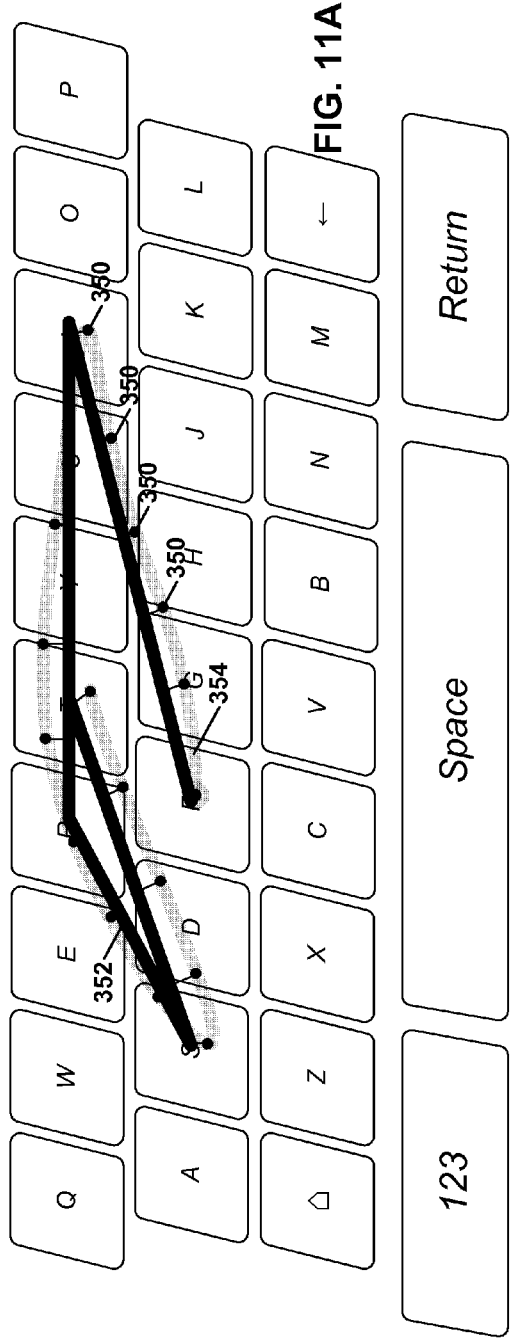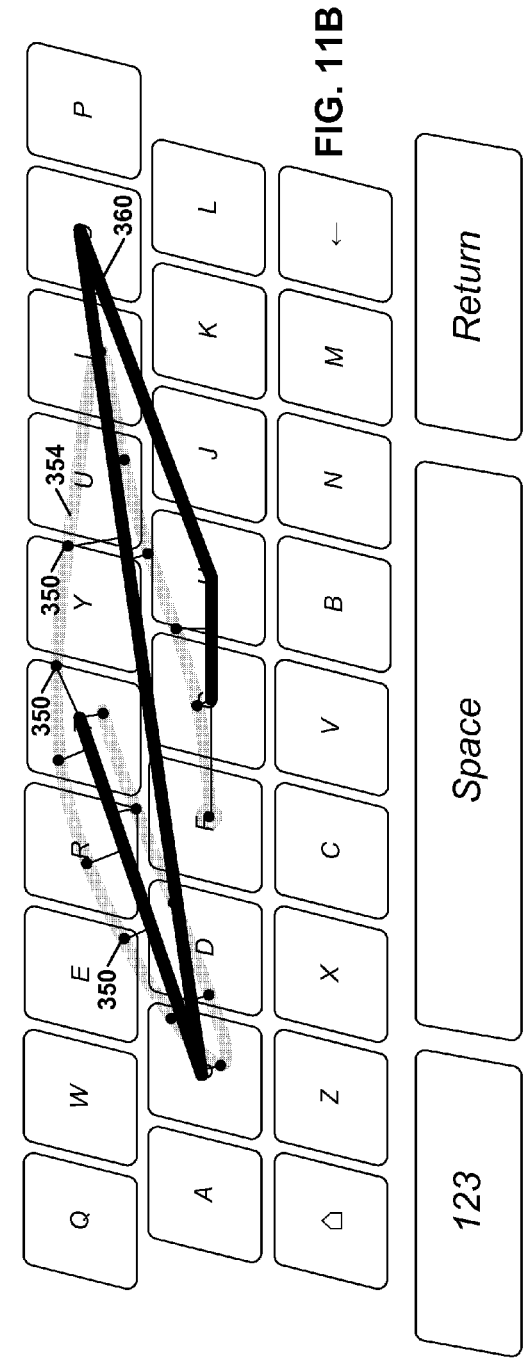

GESTURAL INPUT AT A VIRTUAL KEYBOARD

This application claims the benefit of U.S. Provisional Patent Application No. 61/614,976, filed Mar. 23, 2012, the entire content of which is hereby incorporated by reference.

BACKGROUND

Traditionally, users provide textual input to computing devices by way of physical keyboards. Physical keyboards include physical, depressible buttons that correspond to different characters and functions.

However, many types of modern computing devices do not have physical keyboards. For example, many mobile computing devices, such as smartphones and tablet computers, do not have physical keyboards. Instead, a computing device may include a presence-sensitive display (e.g., a touchscreen) that displays a "virtual" keyboard. The virtual keyboard may include virtual keys that correspond to different characters and functions. Each of the virtual keys may correspond to a different area of the presence-sensitive display.

In some instances, a user may provide textual input to a computing device by tapping the user's finger or a stylus on the virtual keys of a virtual keyboard displayed by the computing device. Thus, to input the word "text," the user may tap on a virtual key that corresponds the letter "t," then tap on the virtual key that corresponds to the letter "e," then tap on the virtual key that corresponds to the letter "x," and then tap on the virtual key that corresponds to the letter "t."

Providing textual input to a computing device by tapping on virtual keys may be problematic for some users. For instance, users may find it difficult to accurately tap the correct virtual keys, especially on small virtual keyboards. Furthermore, because a user cannot feel the virtual keys of a virtual keyboard, the user's fingers may drift out position on the virtual keyboard, resulting in a drop in typing accuracy.

SUMMARY

In general, this disclosure describes techniques for receiving input at a computing device. As described herein, a computing device may receive an indication of a gesture input at a portion of a presence-sensitive surface associated with a virtual keyboard. The gesture input may correspond to a particular word. To determine which word corresponds to the gesture input, the computing device may define a series of input points that represent a path of the gesture input across the virtual keyboard. In addition, the computing device may define sets of anchor points for different words. The anchor points for a word may correspond to locations of different virtual keys associated with the word. The computing device may determine a distance score for each of the anchor points. The computing device may determine a distance score for an anchor point based on a distance on the presence-sensitive surface between the anchor point and an input point that is closest to the anchor point. The computing device may identify, based on the distance scores for the anchor points, the word that corresponds to the gesture input. Determining which word corresponds to the gesture input in this way may increase the speed and accuracy with which a user may input text to the computing device.

In one aspect, this disclosure describes a method that comprises receiving, at a device, an indication of a gesture input at a portion of a presence-sensitive surface associated with a virtual keyboard. The virtual keyboard comprises a set of virtual keys. Each virtual key from the set of virtual keys is associated with a region of the presence-sensitive surface. The method also comprises defining, at the device, a series of input points that represent a path of the gesture input across the virtual keyboard. In addition, the method comprises defining, at the device, sets of anchor points corresponding to different words in a set of candidate words. Each of the anchor points corresponds to a location of the presence-sensitive surface associated with a virtual key from the set of virtual keys. The method also comprises identifying, at the device, for each respective anchor point in each of the sets of anchor points, a relevant input point in the series of input points. Furthermore, the method comprises determining, at the device, a distance score for each respective anchor point in the sets of anchor points. For each anchor point in the sets of anchor points, the distance score for the respective anchor point is based on a distance on the presence-sensitive surface between the respective anchor point and the relevant input point for the respective anchor point. In addition, the method comprises identifying, at the device, based on the distance scores for the anchor points, a word in the set of candidate words that corresponds to the gesture input.

In another aspect, this disclosure describes a computing device that comprises a presence-sensitive display, a processor, and a memory that stores instructions that, when executed by the processor, configure the computing device to output a virtual keyboard for display at the presence-sensitive display. The instructions also configure the computing device to receive an indication of a gesture input at a portion of the presence-sensitive display associated with the virtual keyboard. In addition, the instructions configure the computing device to define a series of input points that represent a path of the gesture input across the virtual keyboard. The instructions also configure the computing device to define sets of anchor points that correspond to different words in a set of candidate words. Each of the anchor points corresponds to a location of the presence-sensitive display associated with a virtual key from the set of virtual keys. Furthermore, the instructions configure the computing device to identify, for each respective anchor point in each of the sets of anchor points, a relevant input point in the series of input points. In addition, the instructions configure the computing device to determine a distance score for each respective anchor point in the sets of anchor points. For each anchor point in the sets of anchor points, the distance score for the anchor point is based on a distance on the presence-sensitive surface between the anchor point and the relevant input point for the anchor point. The instructions also configure the computing device to determine scores for the words based on the distance scores for the anchor points that correspond to the words. In addition, the instructions configure the computing device to identify, based on the scores for the words, that a given word in the set of candidate words corresponds to the gesture input.

In another aspect, this disclosure describes a computer-readable storage medium comprising instructions for causing one or more processors of a computing device to perform operations comprising outputting a virtual keyboard for display at a presence-sensitive display operatively coupled to the computing device, the virtual keyboard including virtual keys associated with characters. The operations also include receiving an indication of a start of a gesture input if the presence-sensitive display detects a presence of an input object at a position associated with the virtual keyboard. In addition, the operations include receiving an indication of a completion of the gesture input in response to receiving an indication that the input object has moved to a position associated with the completion of the input gesture. Furthermore, the operations include defining a series of input points that represent a path of the gesture input across the virtual keyboard. The operations also include down-sampling the series of input points and defining sets of anchor points that correspond to different words in a set of candidate words. Each of the anchor points corresponds to a location of the presence-sensitive display associated with one of the virtual keys. In addition, the operations include identifying, for each respective anchor point in each of the sets of anchor points, a relevant input point in the set of anchor points. The operations also include determining a distance score for each respective anchor point in the sets of anchor points. For each anchor point in the sets of anchor points, the distance score for the respective anchor point is based on a distance on the presence-sensitive surface between the anchor point and the relevant input point for the respective anchor point. The operations also include determining, based on the distance scores, scores for words. Furthermore, the operations include identifying, based on the scores for the words, a word that corresponds to the gesture input. The operations also include outputting the word on the presence-sensitive display.

The details of one or more examples are set forth in the accompanying drawings and the description below. Other features, objects, and advantages will be apparent from the description and drawings, and from the claims.

BRIEF DESCRIPTION OF DRAWINGS

FIG. 11A is a conceptual diagram that illustrates example distances between example input points and an example shape template for a first word.

FIG. 11B is a conceptual diagram that illustrates example distances between example input points and an example shape template for a second word.

DETAILED DESCRIPTION

Figure 1:
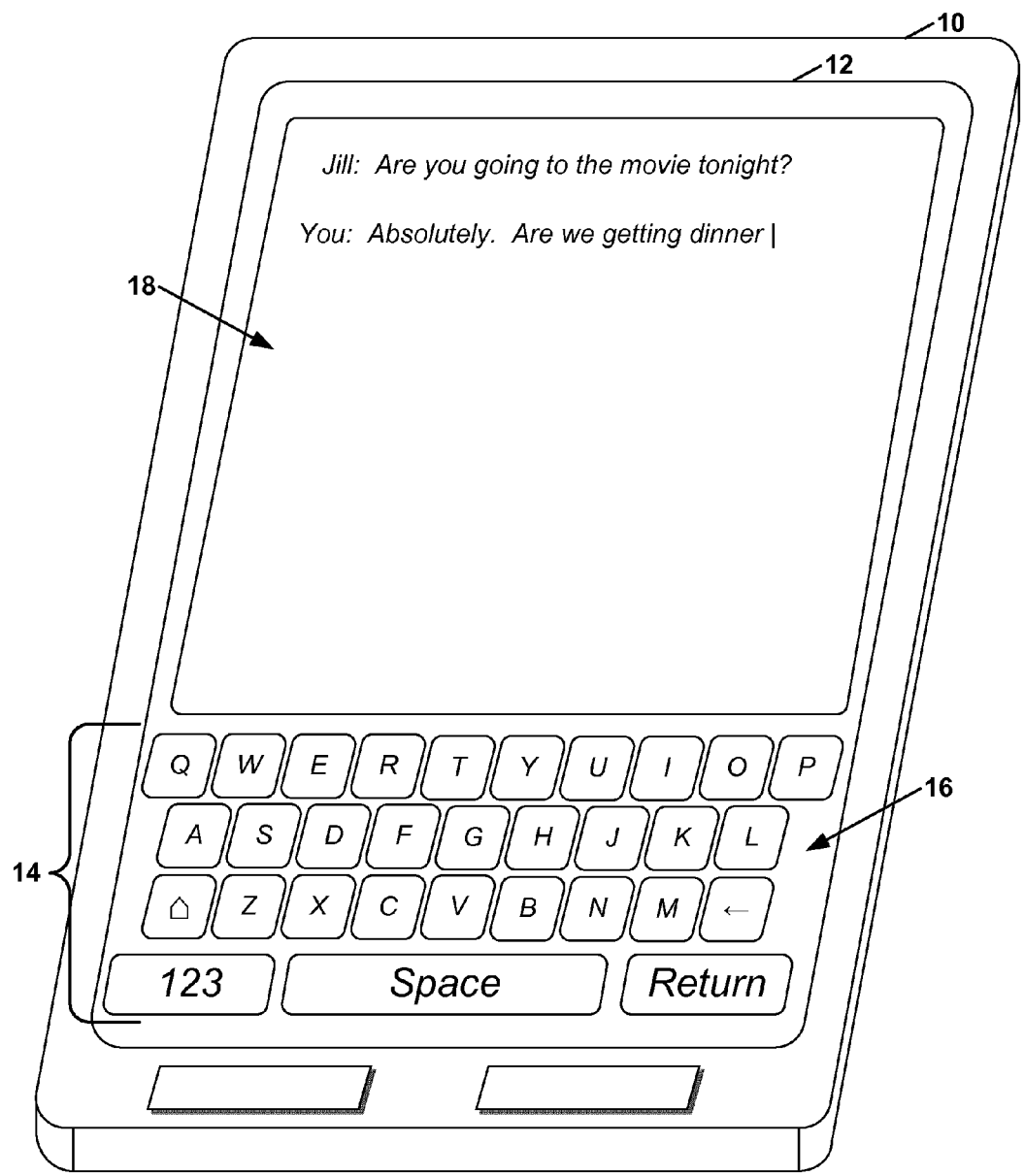
FIG. 1 is a conceptual diagram that illustrates an example computing device that may implement one or more techniques of this disclosure.

The attached drawings illustrate examples. Elements indicated by reference numbers in the attached drawings correspond to elements indicated by like reference numbers in the following description. In the attached drawings, stacked elements in the attached drawings indicate the presence of one or more similar elements. In this disclosure, elements having names that start with ordinal words (e.g., "first," "second," "third," and so on) do not necessarily imply that the elements have a particular order. Rather, such ordinal words may merely be used to refer to different elements of a same or similar type.

As described in detail below, a computing device may be operatively coupled to a presence-sensitive surface associated with a virtual keyboard. The virtual keyboard may include a set of virtual keys. In some examples, the virtual keyboard may include virtual keys that correspond to letters or characters. For example, a first virtual key may correspond to the letter "q," a second virtual key may correspond to the letter "w," a third virtual key may correspond to the letter, "e," and so on. Each virtual key from the set of virtual keys may correspond to a different region or area of the presence-sensitive surface.

When a user inputs a word to the computing device, the computing device may receive an indication of a gesture input at a portion of the presence-sensitive surface associated with the virtual keyboard. When the computing device receives the indication of the gesture input, the computing device may determine that an input object, such as a finger or stylus, has moved to the regions of the presence-sensitive surface that correspond to the virtual keys needed to input the word. The computing device may detect the presence of the input object during the entire movement. For instance, when the user inputs the word "hat," the computing device may detect an input object at the region that corresponds to the virtual key that corresponds to the letter "h." While continuing to detect the presence of the input object, the computing device may detect a sliding movement of the input object to the region that corresponds to the letter "a." In this example, while continuing to detect the presence of the input object, the computing device may then detect a further sliding movement of the input object to the region that corresponds to the letter "t." In this example, the computing device may determine that the gesture input is complete when the computing device determines that the input object has moved to a position associated with a completion of the gesture input. For example, the computing device may determine that the gesture input is complete when the computing device stops being able to detect the presence of the input object at the presence-sensitive surface, such as when the user lifts the input object off of the presence-sensitive surface.

In accordance with the techniques of this disclosure, the computing device may receive an indication of a gesture input at a portion of the presence-sensitive surface associated with the virtual keyboard. In response, the computing device may define a series of "input" points. The input points may represent a path of the gesture input across the virtual keyboard. For ease of explanation, this disclosure may refer to the path of the gesture input across the virtual keyboard as the "detected path." The computing device may define sets of anchor points for different words in a set of candidate words. In other words, the computing device may define sets of anchor points that correspond to different words in the set of candidate words.

Each of the anchor points may correspond to a location on the presence-sensitive surface associated with a virtual key from the set of virtual keys. For example, a first anchor point may correspond to a location on the presence-sensitive surface associated with the virtual key for the letter "q," a second anchor point may correspond to a location on the presence-sensitive surface associated with the virtual key for the letter "w," and so on.

The anchor points for a word may correspond to virtual keys used to input the word. For example, the anchor points for the word "hat" may include an anchor point that corresponds to the virtual key for the letter "h," an anchor point that corresponds to the virtual key for the letter "a," and an anchor point that corresponds to the virtual key for the letter "t."

The computing device may then identify a relevant input point for each respective anchor point in each of the sets of anchor points. In some instances, the relevant input point for an anchor point may be the closest input point to the anchor point. The computing device may then determine a distance score for each respective anchor point in the sets of anchor points. The distance score for an anchor point may be based on a distance on the presence-sensitive surface between the anchor point and the relevant input point for the respective anchor point. Next, the computing device may identify, based on the distance scores for the anchor points, a word from the set of candidate words that corresponds to the gesture input.

The techniques of this disclosure may enable a user to input a word faster and more accurately than systems in which the user performs discrete tapping gesture inputs on regions of a presence-sensitive surface that correspond to separate virtual keys. Furthermore, the techniques of this disclosure may enable a computing device to identify a word faster and more accurately than other systems in which a user enters the word by sliding an input object (e.g., a finger or a stylus) across regions of a presence-sensitive surface associated with virtual keys without moving the input object to a position where the presence-sensitive surface is unable to detect the input object.

FIG. 1 is a conceptual diagram that illustrates an example computing device 10 that may implement one or more techniques of this disclosure. In the example of FIG. 1, computing device 10 is illustrated as a mobile phone or a tablet computer. However, other types of computing devices may implement the techniques of this disclosure. For example, the techniques of this disclosure may be implemented by desktop computers, laptop computers, in-vehicle computers, household appliances, commercial or industrial machines, retail point-of-sale devices, personal media players, portable video gaming devices, video game consoles, gaming (e.g., gambling) devices, and other types of computing devices.

Computing device 10 may be operatively coupled to a display 12. Display 12 may be a presence-sensitive display (e.g., a touchscreen). Computing device 10 may output a virtual keyboard 14 for display at display 12. Virtual keyboard 14 may include a set of virtual keys 16. Each of virtual keys 16 may correspond to a different region of display 12.

Display 12 may be operatively coupled to computing device 10 in various ways. In the example of FIG. 1, display 12 is integrated into a housing of computing device 10. In other examples, display 12 may be physically separate from computing device 10 but may be operatively coupled to computing device 10 via one or more wired and/or wireless communication channels.

In other examples, computing devices that implement the techniques of this disclosure do not necessarily output virtual keyboards for display on presence-sensitive displays. Rather, computing devices may receive indications of gesture inputs at presence-sensitive surfaces that may or may not be presence-sensitive displays. For example, a computing device may be operatively coupled to a presence-sensitive surface that is able to detect the presence of one or more input objects. In this example, physical markings indicating regions that correspond to virtual keys may be physically applied to the presence-sensitive surface. For example, computing device 10 may be a tablet computer equipped with a flap that covers a display screen of the tablet computer when the tablet computer is not in use. In this example, the flap may rest horizontally in front of the tablet computer when the tablet computer is in use. Furthermore, in this example, the flap may include a presence-sensitive surface and physical markings indicating regions that correspond to virtual keys may be applied to the inside face of the flap. In this example, a user of the tablet computer may be able to use the inside face of the flap as a keyboard.

In addition to outputting virtual keyboard 14 for display at display 12, computing device 10 may output a text input region 18 at display 12. Text input region 18 may include a region of display 12 at which computing device 10 may detect text input from a user. In the example of FIG. 1, text input region 18 contains text of a conversation between a user of computing device 10 and another user named "Jill." The conversation may be via an instant messenger application, via a text messaging application (e.g., short message service (SMS)), or via another communication application. In the example of FIG. 1, the user of computing device 10 is inputting text to reply to a message from the other user.

In other examples, users of computing devices may input text for reasons other than conducting a conversation with another user. For example, a user of a computing device may input text to take notes, input commands, make lists, compose documents, prepare programming language code, prepare web content, make posts to social networking services, and to perform other tasks involving entry of text.

When a user inputs a word to computing device 10, computing device 10 may receive an indication of a gesture input at a portion of display 12 that corresponds to virtual keyboard 14. When computing device 10 receives the indication of the gesture input, computing device 10 may detect the presence of an input object at regions of display 12 that correspond to ones of virtual keys 16 that correspond to the word. In some examples, the input object may be a finger or thumb. In other examples, the input object may be a stylus. Computing device 10 may continue to detect the presence of the input object as computing device 10 is receiving the indication of the gesture input. For instance, in some examples, the user does move the input object to a position associated with a completion of the gesture input until the user has moved the finger or stylus to the region of display 12 that corresponds to a virtual key for a last letter of the word.

In examples where virtual keyboard 14 is designed for languages, such as English and Russian, that are written in alphabetical scripts, computing device 10 may detect the presence of an input object at regions of display 12 that correspond to ones of virtual keys 16 that are associated with letters in the word. In examples where virtual keyboard 14 is designed for languages, such as Chinese, that are written in logographic and/or syllabic scripts, computing device 10 may detect the presence of an input object at regions of display 12 that correspond to ones of virtual keys 16 associated with phonetic sounds or components of a word or syllable. The virtual key may be associated with a word when the virtual key is used to input the word.

Figure 2:
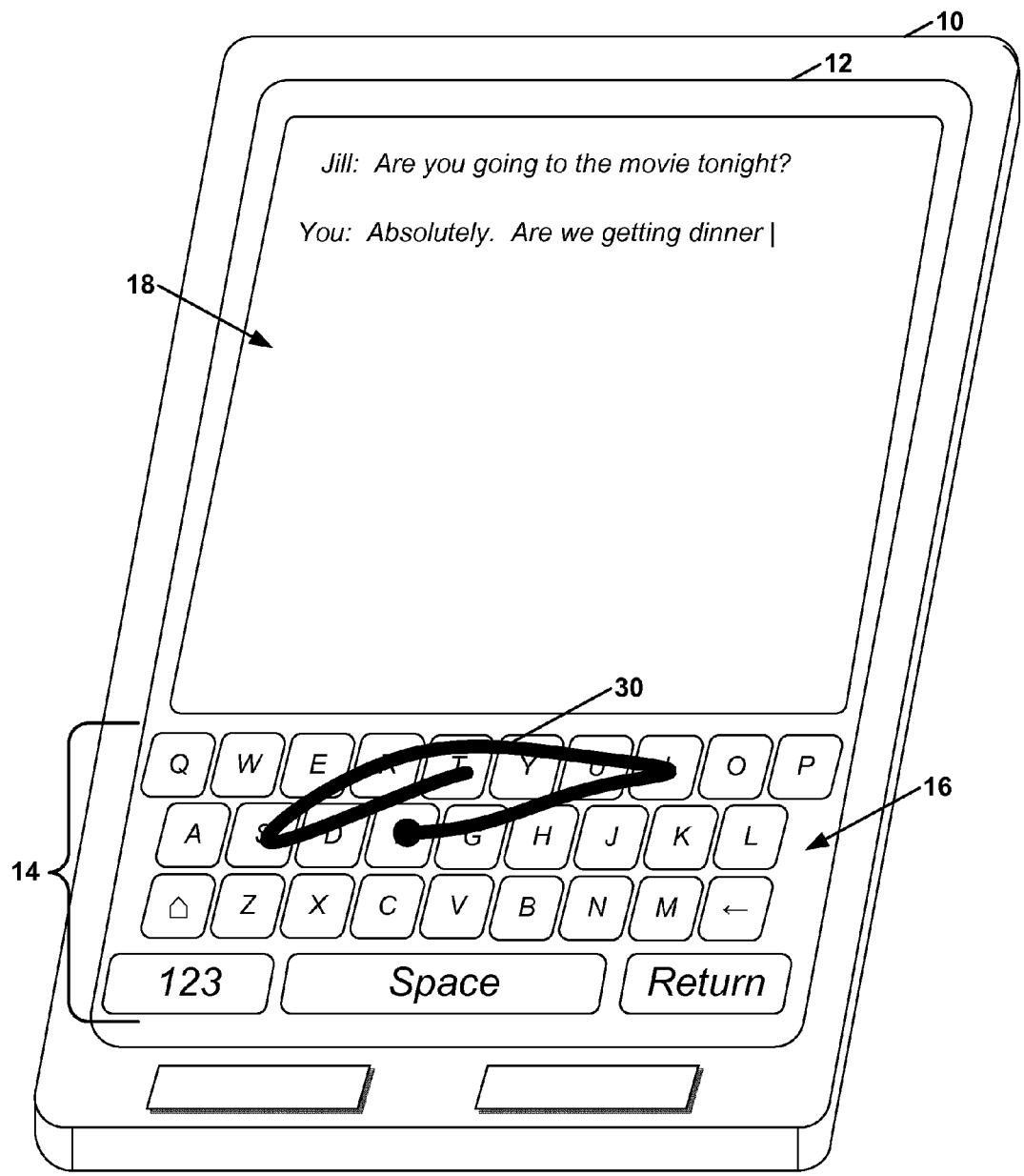
FIG. 2 is a conceptual diagram that illustrates the example computing device of FIG. 1 with a path of a gesture input superimposed on a virtual keyboard.

FIG. 2 is a conceptual diagram that illustrates computing device 10 with a detected path 30 of a gesture input superimposed on virtual keyboard 14. Detected path 30 may correspond to the regions of display 12 at which computing device 10 detected the presence of an input object when a user performed the gesture input. In the example of FIG. 2, the user is attempting to enter the word "first." Accordingly, the user first positions an input object, such as a finger or stylus, at a region of display 12 that corresponds to the virtual key for the letter "f," then slides the input object to the regions of display 12 that correspond to the virtual keys for the letters "i," "r," "s," and "t" while keeping the input object within a space where display 12 is able to detect the presence of the input object. After the user moves the input object to the region of display 12 that corresponds to the virtual key for the letter "t," the user may move the input object to a position associated with a completion of the gesture input. For example, the user may move the input object to a position where display 12 is no longer able to detect the presence of the input object. In another example, the user may move the input object to a position on display 12 that is outside virtual keyboard 14. In typical examples, computing device 10 does not output detected path 30 for display on display 12.

When the user performs the gesture input, computing device 10 may receive an indication of the gesture input at a portion of display 12 that corresponds to virtual keyboard 14. In response to receiving the indication of the gesture input, computing device 10 may identify a word that corresponds to the gesture input. For instance, in the example of FIG. 2, when computing device 10 receives an indication of the gesture input associated with detected path 30, computing device 10 may identify the word "first" as being the word that corresponds to the gesture input.

In some instances, the user may perform a gesture input in which the user does not precisely move an input object to each of the virtual keys associated with a desired word. In such instances, computing device 10 may still be able to determine that the gesture input corresponds to the desired word. For example, if the user performs a gesture input in which the user moves the input object to areas of display 12 that are relatively close to the virtual keys associated with the desired word, computing device 10 may still be able to determine that the gesture input corresponds to the desired word. In this example, if the user wants to input the word "first," computing device 10 may still be able to determine that a gesture input corresponds to the word "first," even if the user does not actually move the input object to the virtual keys for letters "f," "i," "r," "s," and "t."

Figure 3:
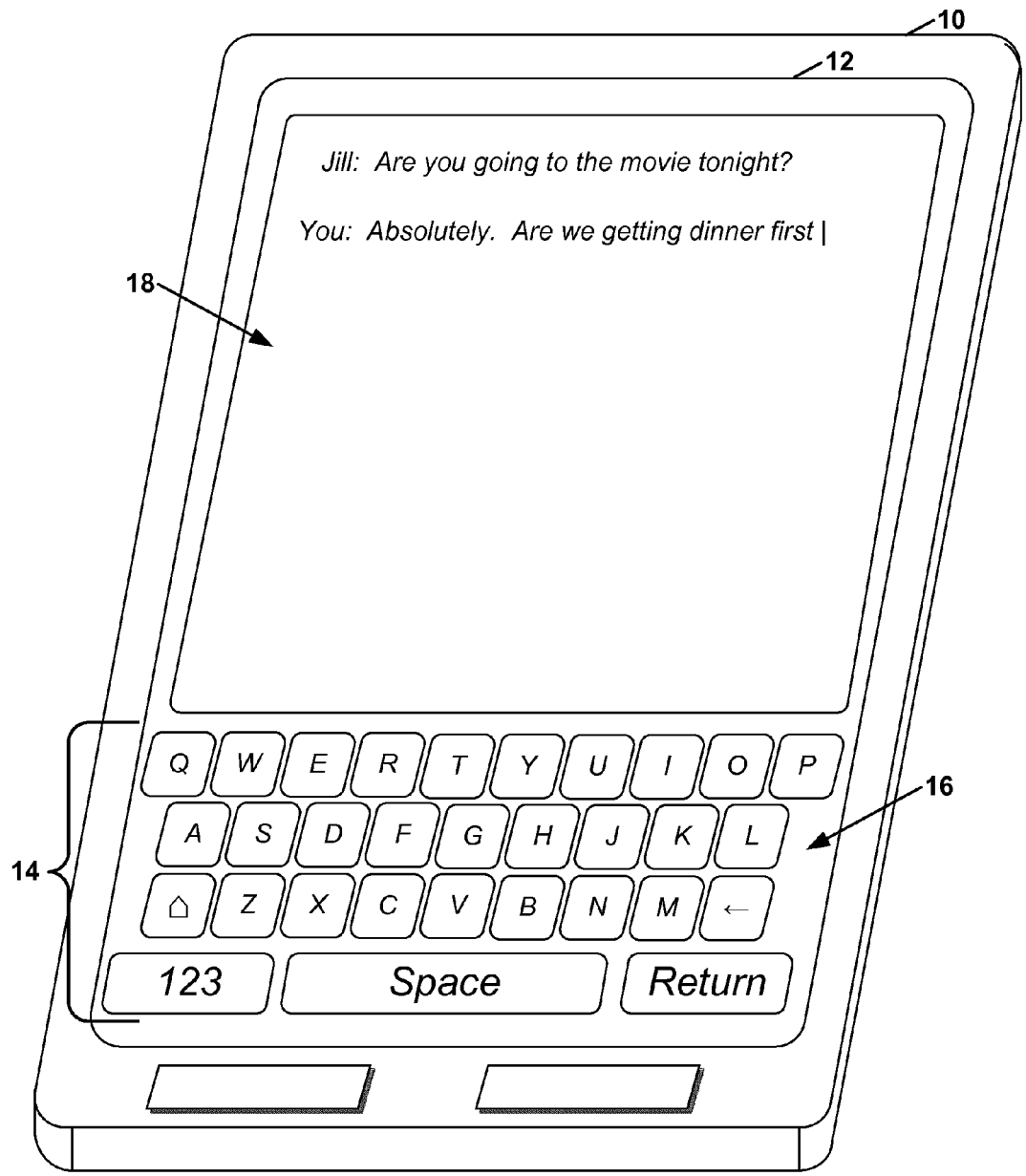
FIG. 3 is a conceptual diagram that illustrates the example computing device of FIG. 1 showing an example result of processing a word that corresponds to the gesture input of FIG. 2.

After identifying a word that corresponds to a gesture input, computing device 10 may process the word in various ways. For example, computing device 10 may store data representing the word to a data storage medium, output a vocalization of the word, transmit data representing the word to another computing device, or otherwise process the word. In some examples, computing device 10 may output the word for display on display 12. As described above with regard to FIG. 2, the user may perform a gesture input that corresponds to the word "first." FIG. 3 is a conceptual diagram that illustrates computing device 10 showing an example result of processing the word "first." In the example of FIG. 3, computing device 10 may output the word "first" in text input region 18 of display 12, thereby completing the phrase "Are we getting dinner first."

To identify a word as corresponding to a gesture input, computing device 10 may define a series of input points that represent a path of a gesture input across virtual keyboard 14. Each of the input points may represent a discrete point on display 12 at which computing device 10 detected the presence of an input object. For instance, each of the input points may represent a discrete point on display 12 that the user touched when performing the gesture input. Each of the input points may have distinct (x, y) coordinates. In this way, computing device 10 may represent the continuous sliding movement of the gesture input as a series of discrete points.

Figure 4:
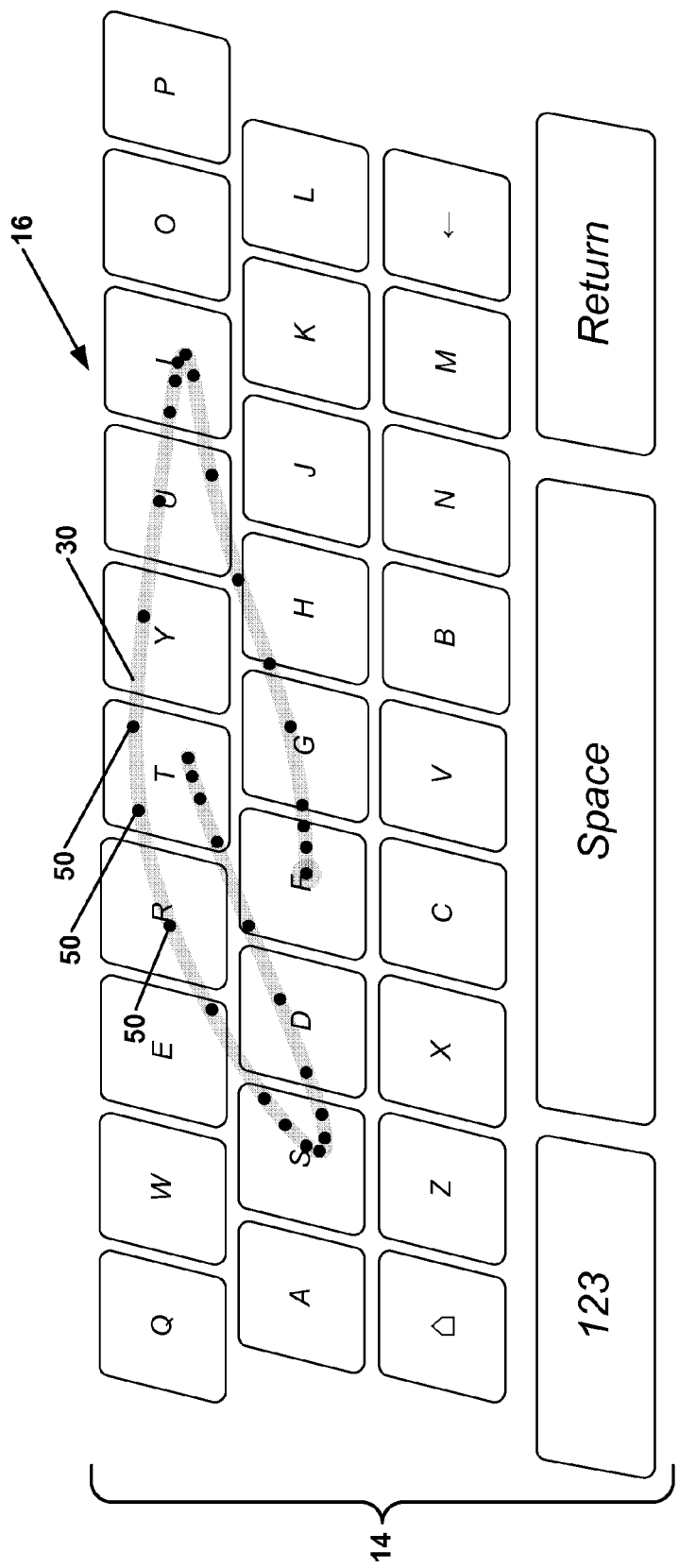
FIG. 4 is a conceptual diagram that illustrates an example series of input points that corresponds to the gesture input of FIG. 2.

FIG. 4 is a conceptual diagram that illustrates an example series of input points 50 that correspond to the gesture input of FIG. 2. For the sake of clarity, FIG. 4 does not include reference numbers for each of input points 50. Input points 50 occur at positions along detected path 30. As discussed above, detected path 30 may correspond to the regions of display 12 at which computing device 10 detected the presence of an input object. In typical examples, computing device 10 does not output input points 50 for display on display 12.

In addition, computing device 10 may define sets of anchor points for different words in a set of candidate words. Each of the anchor points may correspond to a location on display 12 associated with one of virtual keys 16. For example, one anchor point may correspond to the virtual key for the letter "q," another anchor point may correspond to the virtual key for the letter "w," and so on. For ease of explanation, this disclosure may refer to an anchor point that corresponds to a virtual key for a given letter as an anchor point for the given letter.

Each anchor point in a set of anchor points for a word may correspond to a virtual key associated with the word. For example, the set of anchor points for the word "first" may include anchor points for the letters "f," "i," "r," "s," and "t." In another example, the set of anchor points for the word "ghost" may include anchor points for the letters "g," "h," "o," "s," and "t."

Computing device 10 may identify, for each respective anchor point in each of the sets of anchor points, a relevant input point in the series of input points. For example, the set of anchor points for the word "first" may include anchor points for the letters "f," "i," "r," "s," and "t." In this example, computing device 10 may identify one of input points 50 (FIG. 4) as the relevant input point for the anchor point for the letter "f," one of input points 50 as the relevant input point for the anchor point for the letter "i," one of input points 50 as the relevant input point for the anchor point for the letter "r," and so on. As described below, computing device 10 may identify relevant input points for anchor points in various ways. For instance, computing device 10 may identify the closest input point to an anchor point as the relevant input point for the anchor point.

After identifying the relevant input points for the anchor points for a word, computing device 10 may determine distance scores for each of the anchor points for the word. The distance score for an anchor point may be based on a distance on display 12 between the anchor point and the relevant input point for the anchor point. For example, a first anchor point may correspond to the letter "f," a second anchor point may correspond to the letter "i," and so on. In this example, the distance score for the first anchor point may be based on the distance between the first anchor point and the relevant input point for the first anchor point, the distance score for the second anchor point may be based on the distance between the second anchor point and the relevant input point for the second anchor point, and so on.

Figure 5:
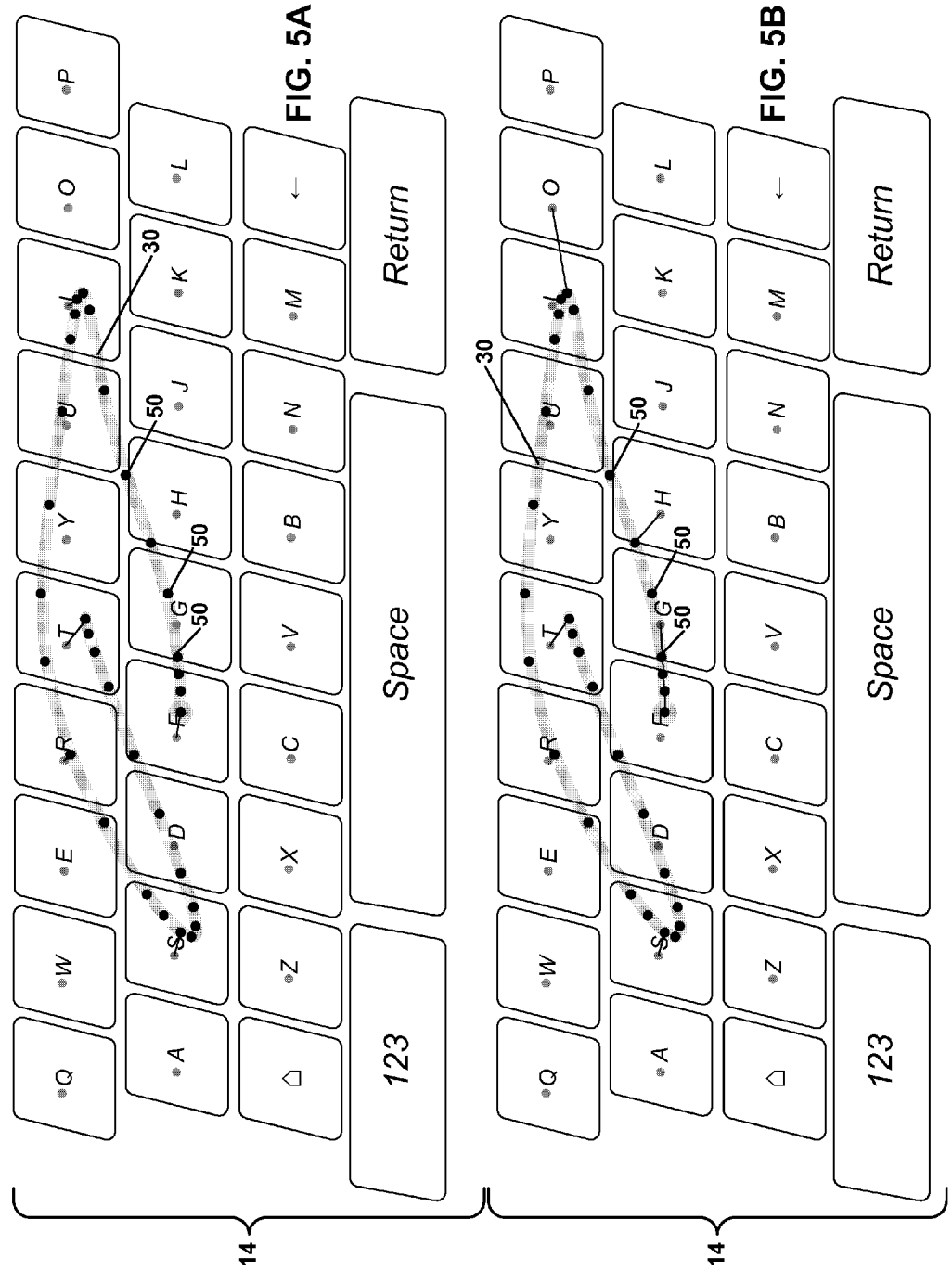
FIG. 5A is a conceptual diagram that illustrates distances between example anchor points for a first word and the input points of FIG. 4.
FIG. 5B is a conceptual diagram that illustrates distances between example anchor points of a second word and the input points of FIG. 4.

FIG. 5A is a conceptual diagram that illustrates distances between example anchor points for the word "first" and input points 50. FIG. 5B is a conceptual diagram that illustrates distances on a presence-sensitive surface between example anchor points for the word "ghost" and input points 50. In examples of FIGS. 5A and 5B, anchor points are indicated by gray dots within virtual keys 16. In the examples of FIGS. 5A and 5B, thin black lines indicate distances between anchor points and the relevant input points for the anchor points. For the sake of clarity, FIGS. 5A and 5B omit the reference numbers for some of input points 50.

Computing device 10 may generate anchor scores for words based on the distance scores for the anchor points for the words. For instance, computing device 10 may generate an anchor score for a first word based on the distance scores for the anchor points for the first word, may generate an anchor score for a second word based on the distance scores for the anchor points for the second word, and so on.

Computing device 10 may generate the anchor score for a word in various ways. For example, computing device 10 may generate the anchor score for a word based on a sum of the distance scores for the anchor points for the word. In this example, the distance scores for anchor points may be based on the distances on display 12 between the anchor points and the relevant input points for the anchor points. By comparing FIG. 5A and FIG. 5B, a reader may see that the total of the distance scores for the anchor points for the word "first" in FIG. 5A is less than the total of the distance scores for the anchor points for the word "ghost" in FIG. 5B. Hence, in this example, the anchor score for the word "first" may be less than the anchor score for the word "ghost."

Computing device 10 may determine, based at least in part on the anchor scores (and thus on the distance scores for the anchor points), that a particular word corresponds to a gesture input. Computing device 10 may determine that the particular word corresponds to the gesture input in various ways. For example, computing device 10 may determine that a particular word corresponds to the gesture input when the particular word has a lowest or highest anchor score.

In this way, computing device 10 may receive an indication of a gesture input at a portion of a presence-sensitive surface (e.g., display 12) associated with virtual keyboard 14. In addition, computing device 10 may define a series of input points that represent a path of the gesture input across virtual keyboard 14. Computing device 10 may also define sets of anchor points for different words in a set of candidate words. Each of the anchor points may correspond to a location of the presence-sensitive surface associated with a virtual key from the set of virtual keys. Computing device 10 may also identify, for each respective anchor point in each of the sets of anchor points, a relevant input point in the series of input points. Computing device 10 may also determine a distance score for each respective anchor point in the sets of anchor points. For each anchor point in the sets of anchor points, the distance score for the respective anchor point may be based on a distance on the presence-sensitive surface between the respective anchor point and the relevant input point for the respective anchor point. Computing device 10 may identify, based on the distance scores for the anchor points, a word in the set of candidate words that corresponds to the gesture input.

Figure 6:
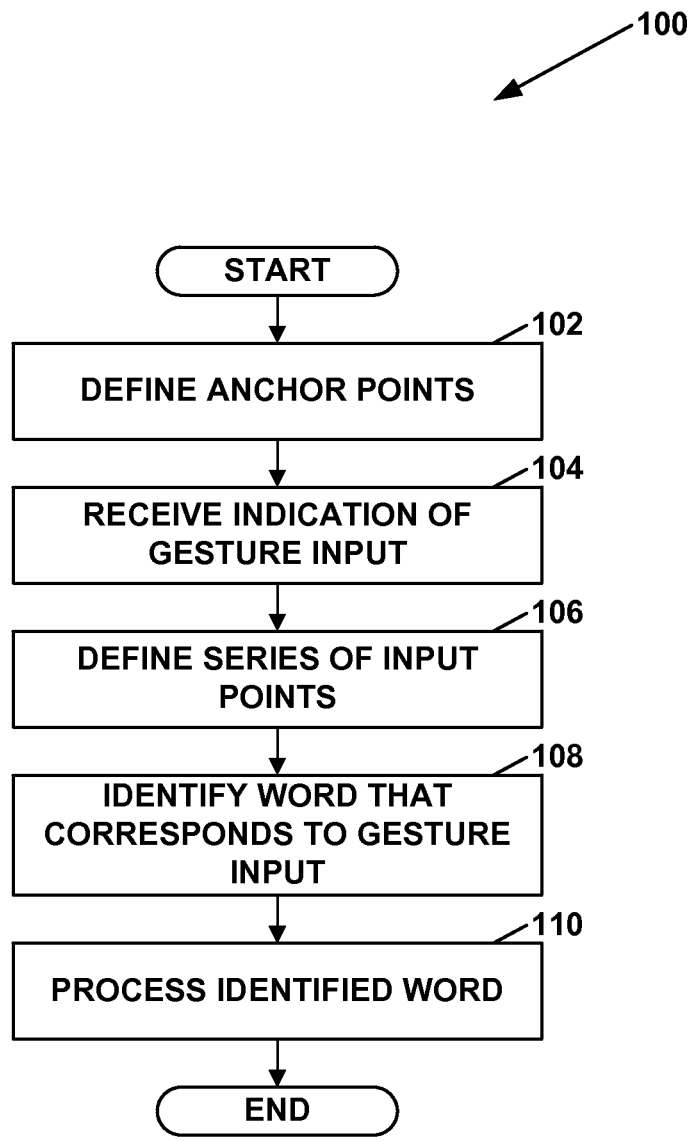
FIG. 6 is a flowchart that illustrates an example operation of a computing device to receive textual input in accordance with the techniques of this disclosure.

FIG. 6 is a flowchart that illustrates an example operation 100 of a computing device to receive textual input in accordance with the techniques of this disclosure. In some examples, computing device 10 (FIG. 1) may perform operation 100.

In other examples, a computing device may perform different operations to receive textual input. For instance, a computing device may perform an operation that includes more, fewer, or different steps than those of operation 100 to identify a word that corresponds to a gesture input. Furthermore, in some instances, one or more of the steps of operation 100 or other operations to identify a word that corresponds to a gesture input may be performed serially or in parallel.

After the computing device starts operation 100, the computing device may define sets of anchor points that correspond to different words in a set of candidate words (102). Each of the anchor points may correspond to a location associated with a virtual key from the set of virtual keys. In some examples, the computing device may define the anchor points such that the anchor points correspond to centers of virtual keys in a virtual keyboard. In other examples, the anchor points do not necessarily correspond to the centers of virtual keys. Rather, the computing device may define the anchor points to correspond to other positions within virtual keys. In some instances, the anchor points may be defined to be at different locations within different virtual keys.

Furthermore, the computing device may receive an indication of a gesture input at a portion of a presence-sensitive surface associated with a virtual keyboard (104). In some examples, the computing device may receive an indication of a start of the gesture input if the presence-sensitive surface detects a presence of an input object at a position associated with the virtual keyboard. In such examples, the computing device may receive an indication of a completion of the gesture input if the presence-sensitive surface detects a movement of the input object to a position associated with the completion of the gesture input. For instance, the computing device may receive an indication of the completion of the gesture input if the presence-sensitive surface detects that the input object has moved to a position where the presence-sensitive surface is no longer able to detect the presence of the input object.

In response to receiving the indication of the gesture input, the computing device may define a series of input points that represent a path of the gesture input across the virtual keyboard (106). In some examples, the computing device may determine, on a periodic basis, the current location on the presence-sensitive surface of an input object. Once per time period, the computing device may define an input point indicating a location on the presence-sensitive surface of the input object. For instance, the computing device may define a new input point fifty times per second. Consequently, the input points may be temporally distributed evenly along the detected path.

The computing device may then use the input points to identify a word in the set of candidate words that corresponds to the gesture input (108). The computing device may use the input points to identify the word that corresponds to the gesture input in various ways. For example, the computing device may perform the example operation of FIG. 7 to identify the word that corresponds to the gesture input. In other examples, the computing device performs operations that are different than the example operation of FIG. 7.

After identifying the word that corresponds to the gesture input, the computing device may process the identified word (110). For example, the computing device may output the word for display at a display, such as display 12 (FIG. 1) after identifying the word. In another example, the computing device may store or transmit data representing the word.

Figure 7:
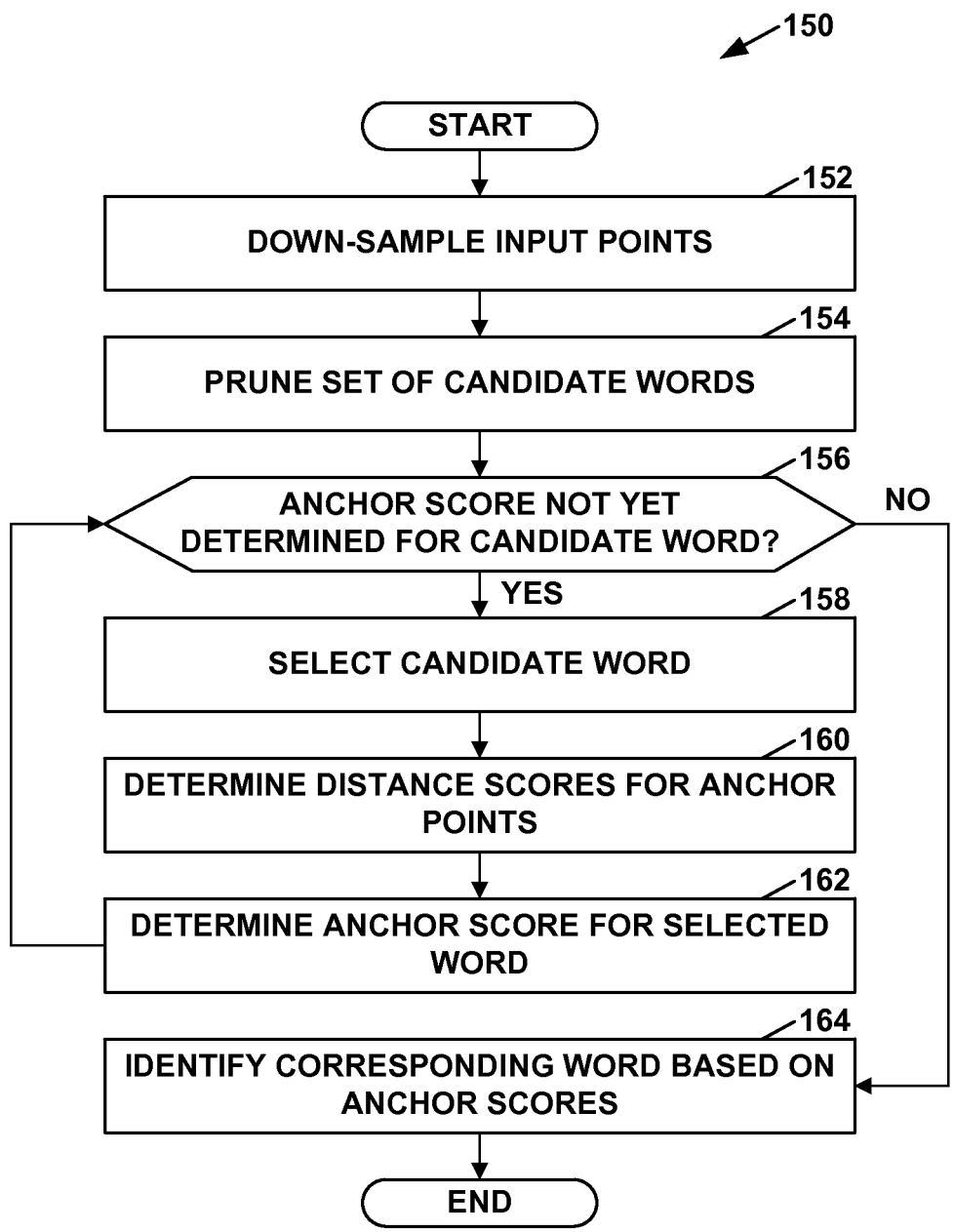
FIG. 7 is a flowchart that illustrates an example operation performed by a computing device to use input points to identify a word that corresponds to a gesture input.

FIG. 7 is a flowchart that illustrates an example operation 150 performed by a computing device to use input points to identify a word that corresponds to a gesture input. In some examples, computing device 10 (FIG. 1) performs operation 150.

In other examples, a computing device may perform different operations to identify a word that corresponds to a gesture input. For instance, a computing device may perform an operation that includes more, fewer, or different steps than those of operation 150 to identify a word that corresponds to a gesture input. Furthermore, in some instances, one or more of the steps of operation 150 or other operations to identify a word that corresponds to a gesture input may be performed serially or in parallel.

After the computing device starts operation 150, the computing device may down-sample the input points (152). When the computing device receives the indication of the gesture input, the computing device may define an initial series of input points that represent the path of the gesture input across the virtual keyboard. After defining the initial series of input points, the computing device may determine that the number of input points in the initial series of input points exceeds a threshold. The computing device may down-sample the initial series of input points to define a down-sampled series of input points in response to determining that the number of input points in the initial series of input points exceeds the threshold. Down-sampling the input points may remove redundant information and accelerate the identification of the word that corresponds to the gesture input.

For example, the computing device may determine whether the number of input points in the initial series of input points exceeds one hundred. In response to determining that the number of input points in the initial series of input points exceeds one hundred, the computing device may eliminate one or more input points from the initial series of input points until there are only one hundred remaining input points. For instance, the computing device may eliminate points according to a ratio int(num/100)+1:1, where num is the number of input points in the initial series of input points. The eliminated input points may be distributed approximately evenly along the detected path. In this example, the computing device may not eliminate any input points if the number of input points in the initial series of input points does not exceed one hundred.

Because of the nature of human movement, the movement of a user's finger or stylus tends to slow as the user's finger or stylus approaches a point where the user intends to change the direction of the movement. The movement tends to accelerate as the user's finger or stylus moves away from a point where the user intends to change the direction of the movement. In many instances, the user changes the direction of the movement at locations associated with the virtual keys associated with the desired word. For instance, in the examples of FIGS. 5A and 5B, the user intends to input the word "first." Consequently, the user's movement is relatively slow near the virtual keys for the letters "f," "i," "s," and "t" and accelerates at times in between. The user may not need to make a sharp turn at the virtual key for the letter "r." Consequently, the user's movement may remain relatively fast near the virtual key for the letter "r."

Because the input points are temporally distributed evenly along the detected path and because movement may slow near the virtual keys associated with the desired word, the input points may cluster near the virtual keys associated with the desired word. Such clustering may occur before and after down-sampling the input points.

After down-sampling the input points, the computing device may prune a set of candidate words (154). The computing device may be configured with a large vocabulary of candidate words. For instance, the computing device may be configured with a vocabulary of 90,000 or more candidate words. It may be impractical to calculate anchor scores for each of the words in this large vocabulary. Accordingly, the computing device may prune (i.e., eliminate) words that are unlikely to be the correct word.

The computing device may prune the set of candidate words based on one or more metrics for the candidate words. The computational intensity required to compute these metrics for the candidate words may be relatively small as compared to calculating anchor scores for the candidate words.

For example, the computing device may identify a first virtual key as being associated with the start of the gesture input and may identify a second virtual key as being associated with the end of the gesture input. In this example, the computing device may prune all words that do not start with the letter associated with the first virtual key and that do not end with the letter associated with the second virtual key. For instance, the computing device may determine that the gesture input starts at a point associated with the virtual key for the letter "f" and ends at a point associated with the virtual key for the letter "t." In this instance, the computing device may prune all candidate words that do not start with the letter "f" and end with the letter "t." Thus, if the set of candidate words initially included the word "Tokyo," the computing device may eliminate the word "Tokyo" from consideration because "Tokyo" does not start with the letter "f" or end with the letter "t." However, the words "first," "fat," "fist," "fest," "fort," "fight," "fast," "fervent," "ferret," "foretopgallant," etc. may remain in the set of candidate words. In this way, the computing device may select a set of candidate words based on an initial input point of the gesture input and a terminal input point of the gesture input. The initial input point of the gesture input may be the temporally earliest input point along the detected path of the gesture input. The terminal input point of the gesture input may be the temporally last input point along the detected path of the gesture input.

Some users may be inaccurate with the starting and ending positions of gesture inputs. Accordingly, in some examples, the computing device may retain (i.e., not prune) some words that do not start with the letter that corresponds to the first virtual key at which the computing device detected the input object and end with the letter that corresponds to the last virtual key at which the computing device detected the input object. Rather, the computing device may retain words when the initial and terminal keys for the words are within particular distances of the initial and terminal input points. The initial key for a word may be the first virtual key at which the computing device detects the presence of an input object when the user is inputting the word. The terminal key for a word may be the last virtual key at which the computing device detects the presence of the input object when the user is inputting the word.

For example, the computing device may retain candidate words that start with letters associated with virtual keys that are within 1.5 key widths of the initial input point and end with letters associated with virtual keys that are within 1.5 key widths of the terminal input point. Thus, in the examples of FIG. 5A and FIG. 5B, the user may intend to input the word "first" and the initial input point is within the virtual key for the letter "f," but the computing device may retain the word "ghost" because the virtual key for the letter "g" is within 1.5 key widths of the initial input point. However, the computing device may prune the word "belt" because the virtual key for the letter "b" is more than 1.5 key widths from the initial input point. A key width may be the width of a virtual key.

Some users are more likely to be inaccurate with regard to the last virtual key associated with a desired word than the first virtual key associated with the desired word. Accordingly, in some examples, the computing device may retain candidate words that end with letters associated with keys that are within 2.5 key widths of the terminal input point. Thus, in the example of FIG. 5A and FIG. 5B, the computing device may retain the word "fish" because the virtual key for the letter "h" is within 2.5 key widths of the terminal input point.

In another example, the computing device may prune a word from the set of candidate words in response to determining that any anchor point that corresponds to the word is more than a given distance from an input point closest to the anchor point. For instance, the computing device may prune a word from the set of candidate words in response to determining that an anchor point that corresponds to the word is more than 1.5 key widths from the input point closest to the anchor point.

In some examples, the computing device may partition the virtual keyboard into a grid of cells. The grid of cells may be thirty-two cells wide by sixteen cells tall. For each cell, the computing device may calculate a distance between a center of the cell and a border of each virtual key. If the distance is below a particular threshold, the computing device may include the virtual key in a neighborhood array for the cell. The threshold may be calculated based on a key width and a configurable search distance. To prune a word from the set of candidate words, the computing device may determine which cell contains the initial input point of the detected path. The computing device may then prune all words from the set of candidate words whose initial keys are not in the neighborhood array for the cell. Similarly, the computing device may determine which cell contains the terminal input point of the detected path. The computing device may then prune all words from the set of candidate words whose terminal keys are not in the neighborhood array for the cell.

In another example, the computing device may be configured to determine the lengths of ideal paths associated with words in the set of candidate words. The ideal path for a word may be a path that passes through the centers of each of the virtual keys associated with the word in the order needed to input the word. In this example, the computing device may prune the set of candidate words based on a comparison of the length of the detected path and the lengths of the ideal paths associated with the candidate words. If the difference between the length of the detected path and the length of the ideal path associated with a candidate word differ by more than a particular amount (e.g., a ratio of lengths exceeds a given threshold), the computing device may eliminate the candidate word. For instance, if the length of the ideal path associated with a candidate word is more than 1.5 times or less than 0.6 times the length of the detected path, the computing device may prune the candidate word from the set of candidate words.

For example, the length of the ideal path associated with the word "fat" is much shorter than the length of the ideal path for the word "foretopgallant." Thus, if the length of the detected path is closer to the length of the ideal path associated with the word "foretopgallant" than to the length of the ideal path associated with the word "fat," the computing device may prune the word "fat" from the set of candidate words.

In some examples, the computing device may store candidate words in a two-dimensional array. Assuming that the virtual keyboard has twenty-six virtual keys, the array may have 676 (26*26) entries in a first dimension. 676 is the number of all possible combinations of two letters. The first letter may correspond to the initial letter of a word and the second letter may correspond to a terminal letter of the word. Entries in the second dimension of the array may correspond to words having various sizes. Consequently, the array may have the following structure, where * indicates any one of the twenty-six possible letters:

[[a*a, aa, a*a, . . . ], [a*b, ab, a*b, . . . ], . . . , [z*z, zz, z*z, . . . ]]

In some examples, the computing device may allow up to forty-eight letters between the first letter and the terminal letter of each word. The computing device may sort the words within each of the first-dimension entries based on the lengths of the ideal paths for the words. By storing the words in such a sorted array, the computing device may be able to quickly prune words based on their starting and terminal keys and based on the lengths of their ideal paths. In some instances, the computing device may be able to prune words based on their starting and terminal keys and the lengths of their ideal paths in an worst case of O(n) time.

After pruning the set of candidate words, the computing device may determine whether there is at least one word in the set of candidate words for which an anchor score have not yet been determined (156). An anchor score for a word is a score based on the distance scores for the anchor points that correspond to the word.

In response to determining that there is at least one word in the set of candidate words for which an anchor score has not yet been determined ("YES" of 156), the computing device may select one of the words in the set of candidate words for which an anchor score has not yet been determined (158). The computing device may then determine distance scores for each anchor point that corresponds to the selected word (160). The computing device may determine the distance scores for anchor points in various ways. For example, the computing device may perform the example operation illustrated in FIGS. 8 and 9 to determine the distance score for an anchor point.

The computing device may determine the distance scores for anchor points of the selected word according to an order that a user would use the corresponding virtual keys to input the selected word. For example, if the selected word is "first," the computing device may determine the distance score for the anchor point for the virtual key "f," then determine the distance score for the anchor point for the virtual key "i," then determine the distance score for the anchor point for the virtual key "r," and so on.

After determining the distance scores for the anchor points that correspond to the selected word, the computing device may determine an anchor score for the selected word based on the distance scores for the anchor points that correspond to the selected word (162). The computing device may determine the anchor score for the selected word in various ways. For example, the computing device may determine the anchor score for the selected word by adding or multiplying the distance scores for the anchor points of the selected word.

After determining the anchor score for the selected word, the computing device may determine again whether there is at least one word in the set of candidate words for which an anchor score has not yet been determined (156). If so, the computing device may repeat steps 158, 160, and 162 to determine the anchor score for another word in the set of candidate words. After the computing device has determined anchor scores for at least some of the words in the set of candidate words, the computing device may identify, based at least in part on the anchor scores for the words, that a particular word in the set of candidate words corresponds to the gesture input (164). The computing device may identify the particular word in various ways. For example, the computing device may perform the example operation illustrated in FIG. 10 to identify the particular word.

Figure 8:
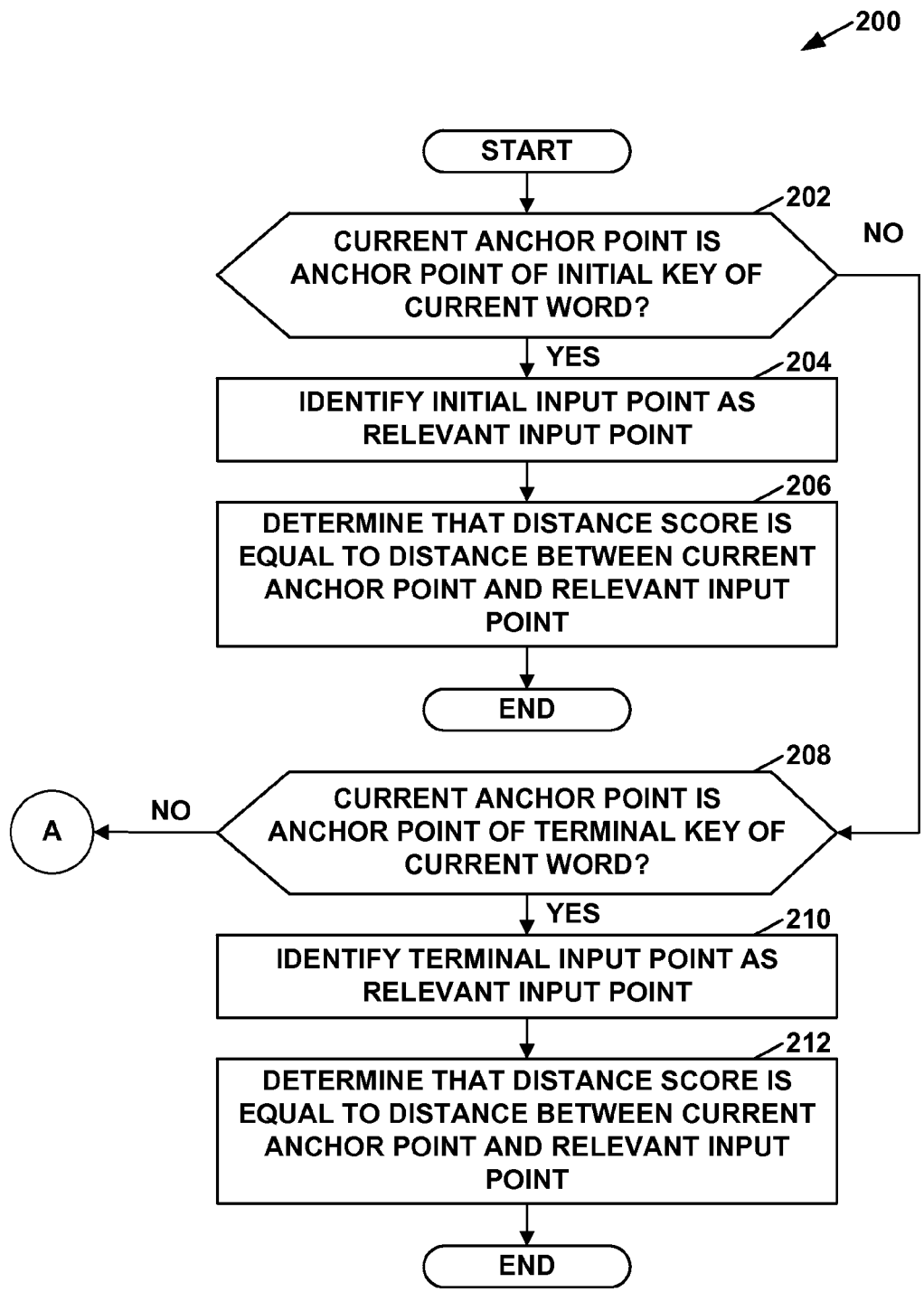
FIG. 8 is a flowchart that illustrates a first part of an example operation performed by a computing device to calculate a distance score for an anchor point.

FIG. 8 is a flowchart that illustrates a first part of an example operation 200 performed by a computing device to calculate a distance score for an anchor point of a word. In some examples, computing device 10 (FIG. 1) may perform operation 200. For ease of explanation, the following description of FIGS. 8 and 9 refers to the anchor point for which the computing device is calculating a distance score as "the current anchor point" and the word as "the current word."

In other examples, a computing device may perform different operations to determine a distance score for an anchor point. For instance, a computing device may perform an operation that includes more, fewer, or different steps than those of operation 200 to determine a distance score for an anchor point. Furthermore, in some instances, one or more of the steps of operation 200 or other operations to determine a distance score for an anchor point may be performed serially or in parallel.

After the computing device starts operation 200, the computing device may determine whether the current anchor point is the anchor point of an initial key of the current word (202). In response to determining that the current anchor point is the anchor point of the initial key of the current word ("YES" of 202), the computing device may identify an initial input point in the series of input points as the relevant input point for the current anchor point (204). In other examples, the computing device may identify a closest input point to the current input point as the relevant input point for the current input point.

The computing device may then determine that the distance score for the current anchor point is equal to the distance between the current anchor point and the relevant input point (206). The computing device may determine the distance between an anchor point and an input point in various ways. For example, the computing device may use an algorithm to calculate the Euclidean distance between the anchor point and the input point. In this example, the computing device may use any of several known methods to determine Euclidean without calculating square roots. In another example, after the computing device determines a distance between an anchor point and an input point, the computing device may store the distance in a cache. In this example, if the computing device needs to determine the distance between the anchor point and the input point when determining an anchor score for a different word, the computing device may determine the distance between the anchor point and the input point by looking up the distance in the cache. In this way, the computing device may determine the distance scores for anchor points based on one or more of the distances indicated by the cache.

In some examples, the cache may be implemented as a two-dimensional array. The two-dimensional array may have one row for each virtual key of the virtual keyboard and one column for each input point. In this example, if the computing device determines a distance between a given anchor point and a given input point, the computing device may enter the distance into a location in the array at the row for the given anchor point and the column for the given input point. Subsequently, if the computing device needs to determine the distance between the given anchor point and the given input point, the computing device may retrieve the distance from the array.

On the other hand, in response to determining that the current anchor point is not the anchor point of the initial key of the current word ("NO" of 202), the computing device may determine whether the current anchor point is the anchor point of the terminal key of the current word (208). In response to determining that the current anchor point is not the anchor point of the terminal key of the current word ("NO" of 208), the computing device may perform the part of operation 200 illustrated in FIG. 9.

However, in response to determining that the current anchor point is the anchor point of the terminal key of the current word ("YES" of 208), the computing device may identify a terminal input point in the series of input points as the relevant input point for the current anchor point (210). In other examples, the computing device may identify a closest input point to the current anchor point as the relevant input point for the current anchor point. The computing device may then determine that the distance score for the current anchor point is equal to the distance between the current anchor point and the relevant input point (212).

Figure 9:
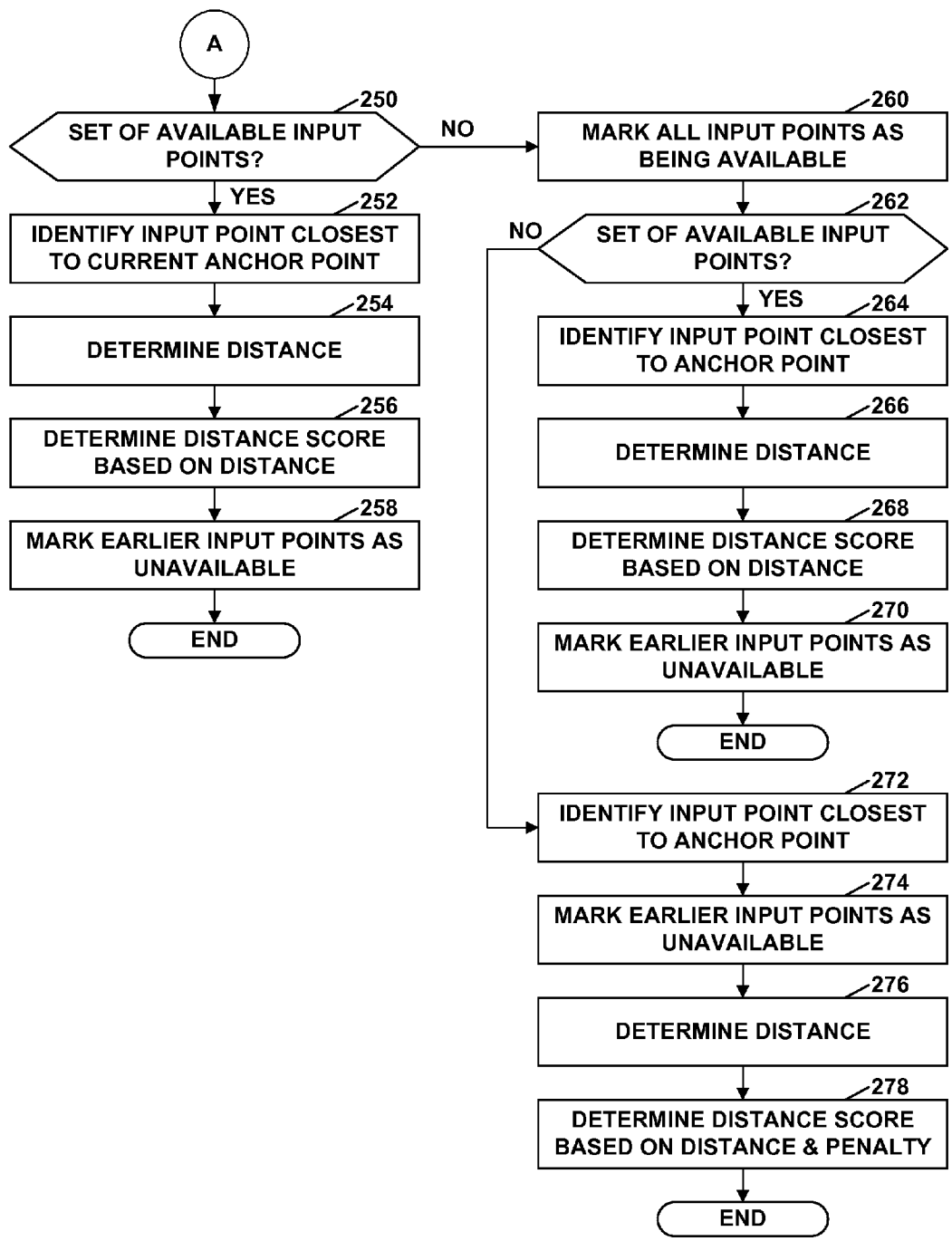
FIG. 9 is a flowchart that illustrates a second part of the example operation of FIG. 8 to calculate a distance score for an anchor point of a word.

FIG. 9 is a flowchart that illustrates a second part of operation 200. In response to determining that the current anchor point is not the anchor point of the initial key of the current word and that the current anchor point is not the anchor point of the terminal key of the current word, the computing device may determine whether there is a set of one or more available input points that are closer to the current anchor point than any other anchor point (250). An input point may be an available input point if the input point occurs after the relevant input point of an anchor point for a previous key of the current word. Likewise, an input point may be unavailable if the input point is the relevant input point for the anchor point for the previous key of the current word. An input point may also be unavailable if the position of the input point on the detected path is before the position on the detected path of the relevant input point for the anchor point for the previous key of the current word.

In response to determining that there is a set of one or more available input points that are closer to the current anchor point than to any other anchor point ("YES" of 250), the computing device may identify, from among the available input points that are closer to the current anchor point than any other anchor point, the input point that is closest to the current anchor point (252). In this way, the computing device may identify the relevant input point for the current anchor point such that the relevant input point is closer to the current anchor point than any other available input point and such that the current anchor point is closer to the relevant input point than any other anchor point.

After identifying the relevant input point for the current anchor point, the computing device may determine the distance between the current anchor point and the relevant input point for the current anchor point (254). The computing device may determine the distance score for the current anchor point based on the distance between the current anchor point and the relevant input point (256). The computing device may determine the distance score for the current anchor point based on the distance in various ways. For example, the computing device may determine the distance score for the current anchor point to be equal to the distance. In another example, the computing device may determine the distance score for the current anchor point by using the distance to look up the distance score in a lookup table. In another example, the computing device may determine the distance score for the current anchor point by performing one or more mathematical operations on the distance.

In addition, the computing device may mark earlier input points as being unavailable (258). The earlier input points may include the relevant input point and input points having positions on the detected path prior to the position on the detected path of the relevant input point. After the computing device marks an input point as being unavailable, the input point may remain unavailable when the computing device determines the distance score for the anchor point for the next key of the current word. In this way, the computing device may ensure that the same input point is not identified as the relevant input point for multiple anchor points in the current word.

The computing device may mark an input point as being unavailable in various ways. For example, the computing device may maintain one or more data structures that indicate availabilities of input points. In this example, the computing device may modify one or more values in the one or more data structures to indicate that particular input points are unavailable. In another example, the computing device may maintain data that identifies a first available input point along the detected path. In this example, the computing device may mark a given input point as being unavailable by modifying the data to identify an input point that occurs on the detected path after the given input point.

On the other hand, in response to determining that there are no available input points that are closer to the current anchor point than any other anchor point ("NO" of 250), the computing device may mark all input points as being available (260). In some circumstances, the computing device may have previously identified a given input point as being the relevant input point for an anchor point for an earlier key of the current word when the given input point potentially should be the relevant input point for the current anchor point. Such circumstances may arise when the detected path passes close to the current anchor point multiple times. For example, when the user is attempting to input the word "before," the detected path may pass close to the letter "e" multiple times. In this example, the current anchor point may be the second letter "e" and the computing device may identify an input point at the end of the detected path as the relevant input point for the anchor point for the first letter "e." Thus, all input points earlier than the input point identified for the anchor point for the first letter "e" may be unavailable. By marking all input points as being available in step 260, the computing device may be able to correctly identify the relevant input point for the current anchor point. Accordingly, if the anchor points that correspond to the current word are close to the detected path, the computing device may not necessarily filter out the current word if the computing device misidentifies an input point for one of the anchor points that corresponds to the current word.

After marking all input points as being available, the computing device may then determine whether there is a set of one or more available input points that are closer to the current anchor point than any other anchor point (262). In response to determining that there are one or more available input points that are closer to the current anchor point than any other anchor point ("YES" of 262), the computing device may identify, from among the available input points that are closer to the current anchor point than any other anchor point, the input point that is closest to the current anchor point (264). In this way, the computing device may identify the relevant input point for the current anchor point such that the relevant input point is closer to the current anchor point than any other anchor point and such that the current anchor point is closer to the relevant input point than any other available input point.

After identifying the relevant input point for the current anchor point, the computing device may determine the distance between the current anchor point and the relevant input point (266). The computing device may then determine a distance score for the current anchor point based on the distance (268). Furthermore, the computing device may mark the relevant input point and earlier input points as being unavailable (270). The computing device may determine the distance, determine the distance score, and mark input points as being unavailable in any of the manners described above or in other manners.

However, in response to determining that there still are no available input points that are closer to the current anchor point than any other anchor point ("NO" of 262), the computing device may identify an available input point that is closest to the current anchor point (272). The computing device may then mark the identified input point and earlier input points as being unavailable (274). Furthermore, the computing device may determine a distance between the current anchor point and the identified input point (276).

After determining the distance, the computing device may determine the distance score for the current anchor point based on the distance and a penalty value (278). In examples where a high distance score for an anchor point is associated with a low likelihood that the virtual key of the anchor point that corresponds to the current word, the penalty value may increase the distance score for the anchor point. In examples where a low distance score for an anchor point is associated with a low likelihood that the virtual key of the anchor point corresponds to the current word, the penalty value may decrease the distance score for the anchor point.

By determining the distance score for the current anchor point based on the distance and the penalty value, the computing device may adjust the distance score for the anchor point in response to determining that the current anchor point is not the closest one of the anchor points to the relevant input point for the current anchor point. In various examples, the computing device may adjust the distance score by various amounts. For example, the computing device may adjust the distance score by 1.3 key widths.

Figure 10:
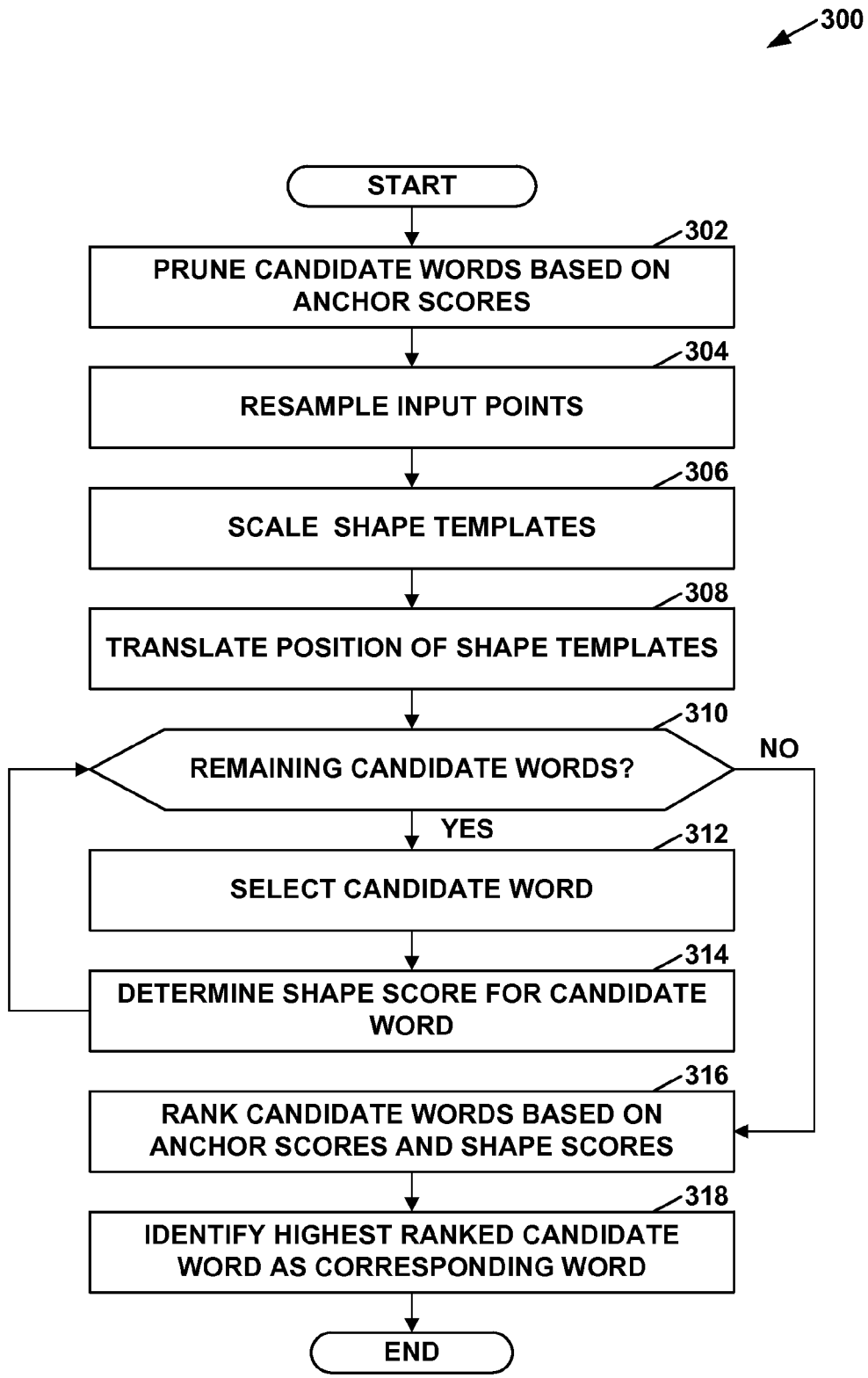
FIG. 10 is a flowchart that illustrates an example operation of a computing device to identify, based on anchor scores for words and shape scores for words, a word that corresponds to a gesture input.

FIG. 10 is a flowchart that illustrates an example operation 300 of a computing device to identify, based on anchor scores and shape scores for words, a word that corresponds to a gesture input. In some examples, computing device 10 (FIG. 1) may perform operation 300. In other examples, a computing device may perform different operations to identify a word based on anchor scores and shape scores. For instance, a computing device may perform an operation that includes more, fewer, or different steps than those of operation 300 to identify a word based on anchor scores and shape scores. Furthermore, in some instances, one or more of the steps of operation 300 or other operations to identify a word based on anchor scores and shape scores may be performed serially or in parallel.

The computing device may start operation 300 after the computing device determines anchor scores for words in a set of candidate sets. As described above, the anchor scores for the words may be based on the distance scores for the anchor points that correspond to virtual keys associated with the words. After the computing device starts operation 300, the computing device may prune candidate words from the set of candidate words based on the anchor scores for the candidate words (302).

The computing device may prune candidate words based on their anchor scores in various ways. For example, the computing device may rank candidate words according to their anchor scores. In this example, the candidate device may prune all candidate words that are not among the n-highest ranked candidate words. For instance, in this example, the computing device may prune a candidate word when the candidate word is not among the top two-hundred ranked candidate words. In another example, the computing device may prune a candidate word if the anchor score for the candidate word is above or below a particular threshold.

Furthermore, the computing device may resample an initial or down-sampled set of input points defined for a detected path such that the input points are evenly distributed spatially along the detected path (304). In other words, the computing device may resample the input points such that there is an equal distance along the detected path between each of the input points. Resampling the input points may involve eliminating certain input points and interpolating other input points. In some examples, the computing device may only need to resample the input points once per gesture input. In other words, it may be unnecessary for the computing device to resample the input points for each word in the set of candidate words.

In addition, the computing device may store or determine shape templates. Each of the shape templates may correspond to a different word. The shape template for a word may represent an ideal path on the virtual keyboard to input the word. For instance, the shape template for the word "bat" may include a straight line from the center of the virtual key for the letter "b" to the center of the virtual key for the letter "a" and another straight line from the center of the virtual key for the letter "a" to the center of the virtual key for the letter "t."

Because different virtual keyboards may have different sizes, the computing device may scale the shape templates of the candidate words such that the widths and/or heights of the shape templates are equal to the width and/or height of the detected path (306). In this way, the computing device may scale a shape template for a given word into a bounding box that has a width and/or height that is equal to a width and/or height of the gesture input. The computing device may scale a shape template according to a scaling ratio s, where s=L/max(W,H), where W and H are the original width and height of the shape template and L is the width of the gesture input.

In addition, the computing device may translate the positions of the shape templates such that the shape templates are in positions that correspond to the input points (308). In some examples, the computing device may translate centroids of the shape templates to a centroid of the series of input points. For example, if the centroid of the input points is at a position with coordinates (25, 76), the computing device may translate the positions of the shape templates such that centroids of the shape templates are at the position with coordinates (25, 76). In other examples, the computing device may scale and/or translate the input points instead of scaling and translating the shape templates.

Subsequently, the computing device may determine whether there are any remaining candidate words (310). The computing device may consider a candidate word to be a remaining candidate word if the computing device has not yet determined a shape score for the candidate word. In response to determining that there are one or more remaining candidate words ("YES" of 310), the computing device may select one of the remaining candidate words (312). The computing device may then determine a shape score for the selected candidate word (314). To determine the shape score for the selected candidate word, the computing device may, for each of the resampled input points, determine a distance between the input point and a point on the shape template that is closest to the input point. The computing device may then calculate the shape score for the candidate word by adding together the determined distances. In this way, the computing device may calculate a second score (i.e., the shape score) for the candidate word after scaling the shape template for the candidate word and after translating a position of the shape template for the candidate word.

In some examples, the computing device may use the following formula to determine the shape score $x_s$, for a word s:

$$x_s = \frac{1}{N} \sum_{i=1}^{N} \|u_i - t_i\|_2$$

In this formula, N indicates the number of input points, $u_i$ indicates a position of an input point i, and $t_i$ indicates a position of a point on the path template closest to the input point i.

After determining a shape score for a candidate word, the computing device may determine again whether there are any remaining candidate words (310). If there are one or more remaining candidate words, the computing device may perform steps 312 and 314 with regard to another remaining candidate word. In this way, the computing device may determine shape scores for the words remaining in the set of candidate words.

In response to determining that there are no remaining candidate words, the computing device may rank the candidate words based on at least in part on their anchor scores and their shape scores (316). After ranking the candidate words, the computing device may identify a highest ranked candidate word as the word that corresponds to the gesture input (318). The computing device may rank the candidate words based on their anchor scores and shape scores in various ways. For example, the computing device may determine a final score for a candidate word by adding together the anchor score and the shape score for the candidate word. In this example, the computing device may rank the candidate words based on the final scores of the candidate words. Furthermore, in this example, weights may be applied to the anchor score or the shape score when determining a final score. In this example, a relatively low final score may correspond to a relatively high ranking. In other examples, a relatively high final score may correspond to a relatively high ranking.

In this way, the computing device may determine a first score for a word based on the distance scores for the anchor points of the word (i.e., an anchor score) and may determine a second score for the word based on a shape of the gesture input (i.e., a shape score). As discussed above, the computing device may determine the second score for the word based on distances between the input points and closest points on a shape template for the word. The computing device may then identify, based on the first score for the word and the second score for the word, the word from among a set of candidate words as the word that corresponds to the gesture input.

In some examples, the computing device may determine one or more additional scores for candidate words. The computing device may then determine final scores for the words based on the anchor scores for the words, shape scores for the words, and the one or more additional scores for the words. The computing device may determine these additional scores instead of or in addition to determining the shape score.

For example, the computing device may determine scores for candidate words based on syntax or language models. In this example, the computing device may store n-gram models that indicate the probabilities of words given the n previously entered words. For instance, in this example, the computing device may determine a score for a word based on a conditional probability of the word given one or more previous words. The conditional probably of the word may be the log conditional probably of the word given the preceding n (e.g., two) words. In this example, the computing device may use the following formula to determine a final score for a word f.

$$S_f = S_{LM} + BS_s + CS_a$$

In this formula, $S_{LM}$ indicates a score for the word f based on a language model (e.g., an n-gram model), $S_s$ indicates a shape score for the word f, and $S_a$ indicates an anchor score for the word. Furthermore, B is a coefficient that is either theoretically or empirically derived from the standard deviations of the gesture input distribution in relation to the shape template that corresponds to the word f. C is a coefficient that is either theoretically or empirically derived from the standard deviations of the gesture input distribution in relation to the anchor points that correspond to the word f. In some examples, the computing device may dynamically update B and C according to a user's drawing speed. As the user draws faster, the computing device may give less weight to the anchor scores and the shape scores.

In some examples, the computing device may be able to determine the anchor score for a word in $O(LN_i)$ time, wherein L is the number of anchor points in the word and $N_i$ is the number of input points after down-sampling. Furthermore, in some examples, the computing device may be able to determine the shape score for a word in $O(N_s^2)$ time in the worst case, where $N_s$ is at least equal to the number of resampled input points.

FIG. 11A is a conceptual diagram that illustrates example distances between example input points 350 and an example shape template 352 for the word "first." For the sake of clarity, FIG. 11A does not include reference numbers for each of input points 350. Input points 350 are spatially distributed evenly along a detected path 354. In the example of FIG. 11A, a computing device may calculate a shape score for the word "first" by summing the distances between input points 350 and the closest points on shape template 352. FIG. 11A shows the distances between input points 350 and the closest points on shape template 352 as thin black lines.

FIG. 11B is a conceptual diagram that illustrates example distances between example input points 350 and an example shape template 360 for the word "ghost." Input points 350 in FIG. 11B are in the same positions as input points 350 in FIG. 11A and follow the same detected path 354. As one can see by comparing FIGS. 11A and 11B, the sum of the distances between input points 350 and shape template 360 are greater than the sum of the distances between input points 350 and shape template 352. Accordingly, the word "first" may have a smaller shape score than the word "ghost." As a result, the word "first" may be ranked higher than the word "ghost."

Figure 12:
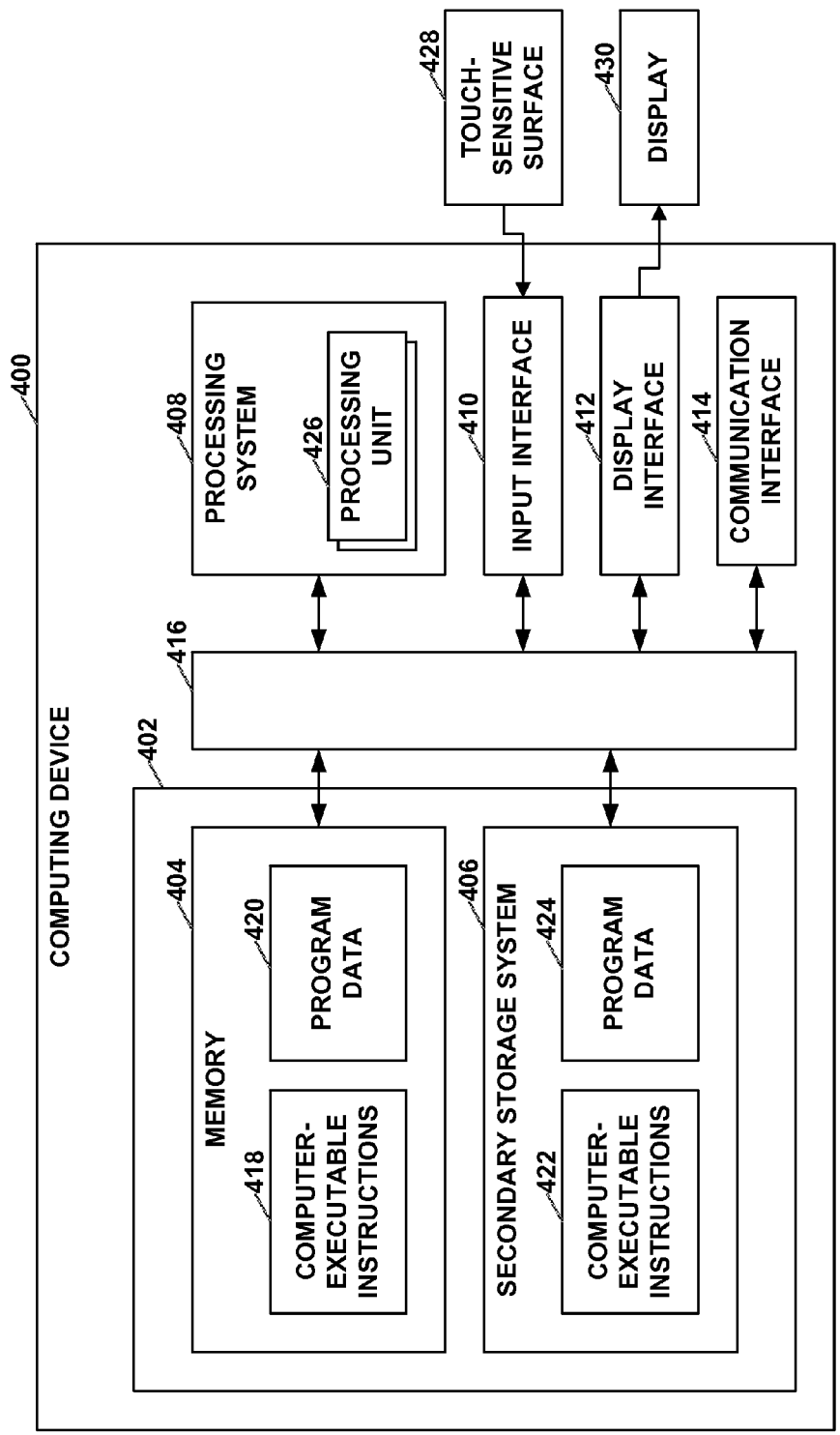
FIG. 12 is a block diagram that illustrates an example configuration of a computing device.

FIG. 12 is a block diagram of an example configuration of a computing device 400. Computing device 400 may be a physical device that processes information. In some examples, computing device 10 may be implemented as one or more computing devices having configurations similar to the configuration of computing device 400.

Computing device 400 may include a data storage system 402, a memory 404, a secondary storage system 406, a processing system 408, an input interface 410, a display interface 412, a communication interface 414, and one or more communication media 416. Communication media 416 may enable data communication between processing system 408, input interface 410, display interface 412, communication interface 414, memory 404, and secondary storage system 406. Computing device 400 may include components in addition to those shown in the example of FIG. 12. Furthermore, some computing devices do not include all of the components shown in the example of FIG. 12.

A computer-readable medium may be a medium from which processing system 408 can read data. Computer-readable media may include computer storage media and communications media. Computer storage media may include physical devices that store data for subsequent retrieval. Computer storage media are not transitory. For instance, computer storage media do not exclusively comprise propagated signals. Computer storage media may include volatile storage media and non-volatile storage media. Example types of computer storage media may include random-access memory (RAM) units, read-only memory (ROM) devices, solid state memory devices, optical discs (e.g., compact discs, DVDs, BluRay discs, etc.), magnetic disk drives, electrically-erasable programmable read-only memory (EEPROM), programmable read-only memory (PROM), magnetic tape drives, magnetic disks, and other types of devices that store data for subsequent retrieval. Communication media may include media over which one device can communicate data to another device. Example types of communication media may include communication networks, communications cables, wireless communication links, communication buses, and other media over which one device is able to communicate data to another device.

Data storage system 402 may include a system that stores data for subsequent retrieval. In the example of FIG. 7, data storage system 402 includes memory 404 and secondary storage system 406. Memory 404 and secondary storage system 406 may store data for later retrieval. In the example of FIG. 7, memory 404 stores computer-executable instructions 418 and program data 420. Secondary storage system 406 may store computer-executable instructions 422 and program data 424. Physically, memory 404 and secondary storage system 406 may each be implemented using one or more computer storage media.

Processing system 408 may be coupled to data storage system 402. Processing system 408 may read computer-executable instructions from data storage system 402 and may execute the computer-executable instructions. Execution of the computer-executable instructions by processing system 408 may configure and/or cause computing device 400 to perform the actions indicated by the computer-executable instructions. For example, execution of the computer-executable instructions by processing system 408 may configure and/or cause computing device 400 to provide Basic Input/Output Systems, operating systems, system programs, application programs, or may configure and/or cause computing device 400 to provide other functionality.

Processing system 408 may read the computer-executable instructions from one or more computer-readable media. For example, processing system 408 may read and execute computer-executable instructions 418 and 422 stored on memory 404 and secondary storage system 406. In some examples, computing device 400 may perform various operations to receive an indication of a gesture input on a presence-sensitive surface and identify a word that corresponds to the gesture input.

Processing system 408 may include one or more processing units 426. Processing units 426 may be implemented as physical devices that execute computer-executable instructions. In various examples, processing units 426 may be implemented as various types of physical devices that execute computer-executable instructions. For example, one or more of processing units 426 may be implemented as a microprocessor, a processing core within a microprocessor, a digital signal processor, a graphics processing unit, or another type of physical device that executes computer-executable instructions.

Input interface 410 may enable computing device 400 to receive input from a presence-sensitive surface 428. Presence-sensitive surface 428 may be implemented as a device that detects the presence of one or more input objects, such as fingers and styli. In some examples, presence-sensitive surface 428 is integrated into a housing of computing device 400. In other examples, presence-sensitive surface 428 is outside a housing of computing device 400.

Display interface 412 may enable computing device 400 to display data on a display 430. Display 430 may include a device that displays output. Example types of displays may include monitors, touch screens, display screens, televisions, and other types of devices that display data. In some examples, display 430 is integrated into a housing of computing device 400. In other examples, display 430 is outside a housing of computing device 400.

Communication interface 414 may enable computing device 400 to send and receive data over one or more communication media. Communication interface 414 may be implemented as various types of devices. For example, communication interface 414 may be implemented as a Network Interface Card (NIC), a wireless network adapter, a Universal Serial Bus (USB) port, or another type of device that enables computing device 400 to send and receive data over one or more communication media.

Figure 13:
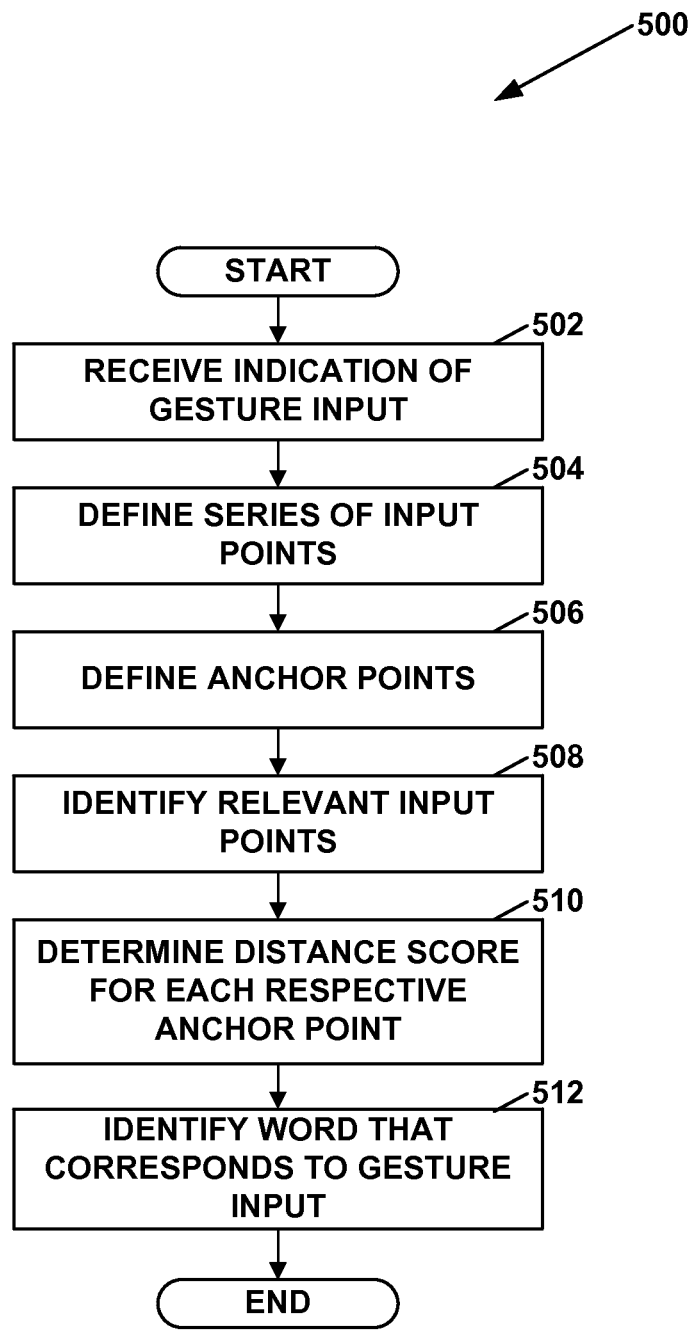
FIG. 13 is a flowchart that illustrates an example operation, in accordance with one or more techniques of this disclosure.

FIG. 13 is a flowchart that illustrates an example operation 500, in accordance with one or more techniques of this disclosure. In some examples, computing device 10 (FIG. 1) may perform operation 500. In other examples, other computing devices may perform operation 500.

After a device starts operation 500, the device may receive an indication of a gesture input at a portion of a presence-sensitive surface associated with a virtual keyboard (502). The virtual keyboard may comprise a set of virtual keys, each virtual key from the set of virtual keys being associated with a region of the presence-sensitive surface. In addition, the device may define a series of input points that represent a path of the gesture input across the virtual keyboard (504). Furthermore, the device may define sets of anchor points corresponding to different words in a set of candidate words (506). Each of the anchor points may correspond to a location of the presence-sensitive surface associated with a virtual key from the set of virtual keys. In addition, the device may identify for each respective anchor point in each of the sets of anchor points, a relevant input point in the series of input points (508). The device may determine a distance score for each respective anchor point in the sets of anchor points (510). For each anchor point in the sets of anchor points, the distance score for the respective anchor point may be based on a distance on the presence-sensitive surface between the respective anchor point and the relevant input point for the respective anchor point. The device may identify, based on the distance scores for the anchor points, a word in the set of candidate words that corresponds to the gesture input (512).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Various examples have been described. These and other examples are within the scope of the following claims.

The invention claimed is:

1. A method comprising:
receiving, by a device, an indication of a gesture input at a portion of a presence-sensitive surface associated with a virtual keyboard, the virtual keyboard comprising a set of virtual keys, each virtual key from the set of virtual keys being associated with a region of the presence-sensitive surface;
defining, by the device, a series of input points that represent a path of the gesture input across the virtual keyboard;
defining, by the device, respective sets of anchor points corresponding to respective words in a set of candidate words, each of the anchor points corresponding to a location of the presence-sensitive surface associated with a virtual key from the set of virtual keys;
identifying, by the device, for each respective anchor point in each of the sets of anchor points, a respective relevant input point in the series of input points;
determining, by the device, a respective distance score for each respective anchor point in the sets of anchor points, wherein for each respective anchor point in the sets of anchor points, the respective distance score for the respective anchor point is based at least in part on a distance on the presence-sensitive surface between the respective anchor point and the respective relevant input point for the respective anchor point, wherein determining the respective distance score for each respective anchor point in each respective set of anchor points comprises adjusting, by the device, the respective distance score for the respective anchor point in response to determining that the respective anchor point is not a closest one of the anchor points in the respective set of anchor points to the respective relevant input point for the respective anchor point; and identifying, by the device, based at least in part on the respective distance scores for the respective anchor points, a word in the set of candidate words that corresponds to the gesture input.

2. The method of claim 1, wherein the anchor points correspond to centers of the virtual keys in the virtual keyboard.

3. The method of claim 1, further comprising after identifying the word, outputting, by the computing device, the word for display.

4. The method of claim 1,
wherein the method further comprises determining, by the device, a score for the word based at least in part on the respective distance scores for the respective anchor points that correspond to the word; and
wherein identifying the word that corresponds to the gesture input comprises identifying, by the device, the word based at least in part on the score for the word.

5. The method of claim 4,
wherein the score for the word is a first score for the word and the method further comprises determining, by the device, a second score for the word based at least in part on a shape of the gesture input; and
wherein identifying the word comprises identifying, by the device, the word based at least in part on the first score for the word and the second score for the word.

6. The method of claim 5, wherein determining the second score for the word comprises determining, by the device, the second score for the word based at least in part on distances between the input points and closest points on a shape template for the word.

7. The method of claim 6, further comprising:
resampling, by the device, the series of input points, wherein after re-sampling, the input points are spatially distributed evenly along the path of the gesture input;
scaling, by the device, the shape template into a bounding box, the bounding box having a width that is equal to a width of the gesture input;
translating, by the device, a position of the shape template such that a centroid of the shape template is located at a centroid of the series of input points; and
determining, by the device, the second score for the word after scaling the shape template and translating the position of the shape template.

8. The method of claim 1, wherein the word is a first word and the method comprises:
determining, by the device, respective anchor scores for respective words in the set of candidate words, the respective anchor scores for the respective words based at least in part on the distance scores for the anchor points that correspond to the respective words;
pruning, by the device, one or more words from the set of candidate words based at least in part on the respective anchor scores for the respective words;
after pruning the one or more words from the set of candidate words based at least in part on the respective anchor scores for the respective words, determining, by the device, respective shape scores for respective words remaining in the set of candidate words, the respective shape scores for the respective words remaining in the set of candidate words being based at least in part on distances between the input points and closest points on shape templates for the respective words remaining in the set of candidate words; and
identifying, by the device, based at least in part on the respective anchor scores and the respective shape scores for the respective words remaining in the set of candidate words, that the first word corresponds to the gesture input.

9. The method of claim 1,
wherein the score for the word is a first score for the word and identifying the word comprises:
determining, by the device, an anchor score for the word, the anchor score for the word based at least in part on the respective distance scores for the respective anchor points that correspond to the word; and
determining, by the device, a second score for the word, the second score based at least in part on a conditional probability of the word given one or more previous words; and
wherein identifying the word comprises identifying, by the device, the word from among the set of words based at least in part on the anchor score for the word and the second score for the word.

10. The method of claim 1, further comprising selecting, by the device, the set of candidate words based at least in part on an initial input point of the gesture input and a terminal input point of the gesture input.

11. The method of claim 1, wherein defining the series of input points comprises:
determining, by the device, that the number of input points in the series of input points exceeds a threshold; and
down-sampling, by the device prior to identifying the respective relevant input points, the series of input points in response to determining that the number of input points in the series of input points exceeds the threshold.

12. The method of claim 1,
wherein the method further comprises storing, by the device, a cache that indicates distances between the anchor points and the input points; and
wherein determining the respective distance score for each respective anchor point in the sets of anchor points comprises determining, by the device, the distance score for an anchor point based at least in part on one or more of the distances indicated by the cache.

13. The method of claim 1, wherein receiving the indication of the gesture input comprises:
detecting, by the device, a start of the gesture input if the presence-sensitive surface detects a presence of an input object at a position associated with the virtual keyboard; and
detecting, by the device, a completion of the gesture input if the presence-sensitive surface detects a movement of the input object to a position associated with the completion of the gesture input.

14. The method of claim 1, wherein identifying a respective relevant input point for each respective anchor point in each of the sets of anchor points comprises:
identifying, by the device, an initial input point in the series of input points as the respective relevant input point for the respective anchor point in response to determining that the respective anchor point is an anchor point for an initial key of the word;
identifying, by the device, a terminal input point in the series of input points as the respective relevant input point for the respective anchor point in response to determining that the respective anchor point is an anchor point for a terminal key of the word; and identifying, by the device, a given input point as the respective relevant input point for the respective anchor point in response to determining that the given input point is closer to the respective anchor point than any other one of the input points and that the respective anchor point does not correspond to the initial or terminal key of the word.

15. A computing device that comprises:
one or more processors; and
a memory that stores instructions that, when executed by the one or more processors, configure the computing device to:
   output a virtual keyboard for display at a presence-sensitive display;
   receive an indication of a gesture input at a portion of the presence-sensitive display associated with the virtual keyboard;
   define a series of input points that represent a path of the gesture input across the virtual keyboard;
   define respective sets of anchor points that correspond to respective words in a set of candidate words, each of the anchor points corresponding to a location associated with a virtual key from the set of virtual keys;
   identify, for each respective anchor point in each of the sets of anchor points, a respective relevant input point in the series of input points;
   determine a respective distance score for each respective anchor point in the sets of anchor points, wherein for each respective anchor point in the sets of anchor points, the respective distance score for the respective anchor point is based at least in part on a distance on the presence-sensitive surface between the respective anchor point and the respective relevant input point for the anchor point;
   for each respective anchor point in each respective set of anchor points, adjust the respective distance score for the respective anchor point in response to determining that the respective anchor point is not a closest one of the anchor points in the respective set of anchor points to the respective relevant input point for the respective anchor point;
   determine respective scores for respective words from the set of candidate words based at least in part on the respective distance scores for the respective anchor points that correspond to the respective words; and
   identify, based at least in part on the respective scores for the respective words, that a given word in the set of candidate words corresponds to the gesture input.

16. The computing device of claim 15, wherein the instructions, when executed by the one or more processors, configure the computing device to:
   receive an indication of a start of the gesture input if the presence-sensitive display detects a presence of an input object at a position associated with the virtual keyboard; and
   receive an indication of a completion of the gesture input if the presence-sensitive display detects a movement of the input object to a position associated with the completion of the gesture input.

17. The computing device of claim 15, wherein the instructions, when executed by the one or more processors, configure the computing device to output the given word for display in response to determining that the given word corresponds to the gesture input.

18. The computing device of claim 15, wherein the respective scores for the respective words are respective first scores for the respective words and the instructions, when executed by the one or more processors, configure the computing device to:
   determine, based at least in part on a shape of the gesture input, respective second scores for the respective words; and
   determine, based at least in part on the respective first scores for the respective words and the respective second scores for the respective words, that the given word corresponds to the gesture input.

19. A computer-readable storage medium comprising instructions for causing one or more processors of a computing device to perform operations comprising:
   outputting a virtual keyboard for display at a presence-sensitive display, the virtual keyboard including virtual keys associated with characters;
   receiving an indication of a start of a gesture input if a presence-sensitive display detects a presence of an input object at a position associated with the virtual keyboard;
   receiving an indication of a completion of the gesture input if the presence-sensitive display detects a movement of the input object to a position associated with the completion of the gesture input;
   defining a series of input points that represent a path of the gesture input across the virtual keyboard;
   down-sampling the series of input points;
   defining respective sets of anchor points that correspond to respective words in a set of candidate words, each of the anchor points corresponding to a location of the presence-sensitive display associated with one of the virtual keys;
   identifying, for each respective anchor point in each of the sets of anchor points, a respective relevant input point in the set of anchor points;
   determining a respective distance score for each respective anchor point in the sets of anchor points, wherein for each respective anchor point in the sets of anchor points, the respective distance score for the respective anchor point is based at least in part on a distance on the presence-sensitive surface between the respective anchor point and the respective relevant input point for the respective anchor point;
   for each respective anchor point in each respective set of anchor points, adjusting the respective distance score for the respective anchor point in response to determining that the respective anchor point is not a closest one of the anchor points in the respective set of anchor points to the respective relevant input point for the respective anchor point;
   determining, based at least in part on the respective distance scores for the respective anchor points, respective scores for the respective words in the set of candidate words;
   identifying, based at least in part on the respective scores for the respective words, a word that corresponds to the gesture input; and
   outputting the word for display at the presence-sensitive display.

* * * * *